US012366651B2

(12) United States Patent
Yamaguchi et al.

(10) Patent No.: US 12,366,651 B2
(45) Date of Patent: Jul. 22, 2025

(54) IMAGING APPARATUS

(71) Applicant: Panasonic Intellectual Property Management Co., Ltd., Osaka (JP)

(72) Inventors: Hiroshi Yamaguchi, Osaka (JP); Kazuhiro Yamada, Osaka (JP); Yosuke Asai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 340 days.

(21) Appl. No.: 18/079,162

(22) Filed: Dec. 12, 2022

(65) Prior Publication Data

US 2023/0112817 A1    Apr. 13, 2023

Related U.S. Application Data

(63) Continuation of application No. PCT/JP2020/047285, filed on Dec. 17, 2020.

(30) Foreign Application Priority Data

Jun. 19, 2020   (JP) .................................. 2020-106524

(51) Int. Cl.
*G01S 13/88* (2006.01)
*G01S 13/00* (2006.01)
(Continued)

(52) U.S. Cl.
CPC .......... *G01S 13/887* (2013.01); *G01S 13/003* (2013.01); *G01S 13/75* (2013.01); *G01S 13/89* (2013.01)

(58) Field of Classification Search
CPC ...... G01S 13/887; G01S 13/003; G01S 13/75; G01S 13/89; G01S 2013/462; G01N 21/3581; G01N 21/4738; G01N 2021/1765
See application file for complete search history.

(56) References Cited

U.S. PATENT DOCUMENTS

2006/0109174 A1* 5/2006 Baharav .................. G01S 13/04
342/179
2006/0273255 A1* 12/2006 Volkov .................. G01S 13/887
250/341.1
(Continued)

FOREIGN PATENT DOCUMENTS

CN        111103583        5/2020
EP        3 287 816        2/2018
(Continued)

OTHER PUBLICATIONS

International Search Report issued Mar. 16, 2021 in International (PCT) Application No. PCT/JP2020/047285.

*Primary Examiner* — Georgia Y Epps
*Assistant Examiner* — Monica T Taba
(74) *Attorney, Agent, or Firm* — Wenderoth, Lind & Ponack L.L.P.

(57) ABSTRACT

An imaging apparatus includes: a reflector which covers an imaging space on a pathway that a human passes through, from at least one of both sides of the pathway, and diffusely reflects a sub-terahertz wave; a first light source which emits a sub-terahertz wave onto the reflector; and a first detector which receives a reflected wave of the sub-terahertz wave emitted from the first light source, diffusely reflected by the reflector, and reflected by the human, and generates an image based on the reflected wave received. The first light source and the first detector are located at a first direction side relative to a center of the imaging space in a direction in which the pathway extends.

14 Claims, 23 Drawing Sheets

(51) Int. Cl.
  *G01S 13/75* (2006.01)
  *G01S 13/89* (2006.01)

(56) References Cited

U.S. PATENT DOCUMENTS

| | | | |
|---|---|---|---|
| 2009/0212217 A1* | 8/2009 | Mann | G02B 7/1821 |
| | | | 250/334 |
| 2009/0294704 A1 | 12/2009 | Zailer et al. | |
| 2013/0307714 A1 | 11/2013 | Williams et al. | |
| 2019/0259791 A1 | 8/2019 | Itsuji et al. | |
| 2020/0393594 A1* | 12/2020 | Obata | G06V 40/10 |
| 2022/0224845 A1 | 7/2022 | Yamada et al. | |

FOREIGN PATENT DOCUMENTS

| | | |
|---|---|---|
| JP | 2008-509385 | 3/2008 |
| JP | 2018-87725 | 6/2018 |
| WO | 2006/013379 | 2/2006 |
| WO | 2018/097035 | 5/2018 |
| WO | 2021/070428 | 4/2021 |

* cited by examiner

IMAGING APPARATUS

CROSS REFERENCE TO RELATED APPLICATIONS

This is a continuation application of PCT International Application No. PCT/JP2020/047285 filed on Dec. 17, 2020, designating the United States of America, which is based on and claims priority of Japanese Patent Application No. 2020-106524 filed on Jun. 19, 2020. The entire disclosures of the above-identified applications, including the specifications, drawings and claims are incorporated herein by reference in their entirety.

FIELD

One or more exemplary embodiments disclosed herein relate generally to imaging apparatuses.

BACKGROUND

Conventionally, imaging apparatuses which capture images of imaging targets using a terahertz wave and a sub-terahertz wave have been known. For example, Patent Literature 1 discloses an image obtaining apparatus which obtains an image of a target using a terahertz wave.

CITATION LIST

Patent Literature

PTL 1: Japanese Unexamined Patent Application Publication No. 2018-87725

SUMMARY

Technical Problem

Imaging apparatuses which capture images of imaging targets using sub-terahertz waves are required to efficiently irradiate the imaging targets with sub-terahertz waves in order to, for example, increase the image quality.

One non-limiting and exemplary embodiments provide imaging apparatuses capable of efficiently irradiating imaging targets with sub-terahertz waves.

Solution to Problem

In one general aspect, the techniques disclosed here feature an imaging apparatus according to an aspect of the present disclosure includes: a reflector which covers an imaging space on a pathway that an imaging target passes through, from at least one of both sides of the pathway, and diffusely reflects a sub-terahertz wave; a first light source which emits a sub-terahertz wave onto the reflector; and a first detector which receives a reflected wave of the sub-terahertz wave emitted from the first light source, diffusely reflected by the reflector, and reflected by the imaging target, and generates an image based on the reflected wave received. The first light source and the first detector are located at a first direction side relative to a center of the imaging space in a direction in which the pathway extends.

General and specific aspect(s) disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The imaging apparatus according to one or more exemplary embodiments or features disclosed herein makes it possible to efficiently irradiate an imaging target with a sub-terahertz wave.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Summary of the Present Disclosure

Figure 1:
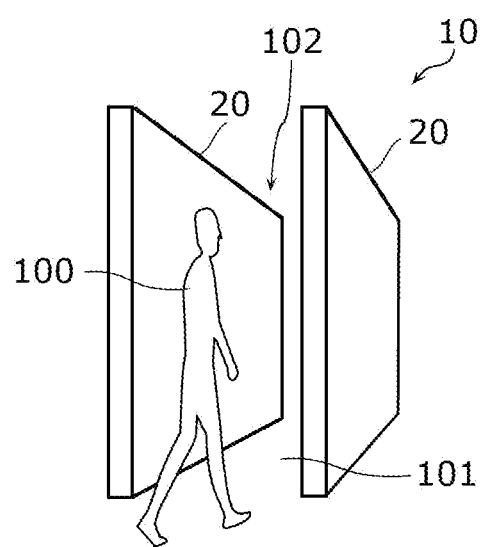
FIG. 1 is a schematic diagram illustrating an appearance of an imaging apparatus according to an embodiment.

The summary of an aspect of the present disclosure is as indicated below.

An imaging apparatus according to the aspect of the present disclosure includes: a reflector which covers an imaging space on a pathway that an imaging target passes through, from at least one of both sides of the pathway, and diffusely reflects a sub-terahertz wave; a first light source which emits a sub-terahertz wave onto the reflector; and a first detector which receives a reflected wave of the sub-terahertz wave emitted from the first light source, diffusely reflected by the reflector, and reflected by the imaging target, and generates an image based on the reflected wave received. The first light source and the first detector are located at a first direction side relative to a center of the imaging space in a direction in which the pathway extends.

It is to be noted that "a sub-terahertz wave" in the DESCRIPTION means an electromagnetic wave of a frequency in a range from 0.05 THz to 2 THz, inclusive. The sub-terahertz wave in the DESCRIPTION may be an electromagnetic wave of a frequency in a range from 0.08 THz to 1 THz, inclusive. In addition, in the DESCRIPTION, "being diffusely reflected" means that a sub-terahertz wave which enters a reflector at one incidence angle from a macro perspective is reflected at a plurality of reflection angles by a structure with a plurality of concaves and convexes from a micro perspective.

According to the aspect, the imaging space is covered by the reflector from at least one side of the imaging space, and thus the sub-terahertz wave emitted from the first light source is diffusely reflected by the reflector and enters the imaging target. In this way, the inner surface of the reflector functions as a surface light source, and the imaging target is irradiated with the sub-terahertz wave in a comparatively wide range at various angles. Although a visible light tends to be diffusely reflected on a surface of an imaging target, a sub-terahertz wave tends to be mirror-reflected on a surface of an imaging target because the sub-terahertz wave has a longer wavelength than the visible light and thus the sizes of concaves and convexes on the surface of the imaging target are likely to be less than or equal to the wavelength of the sub-terahertz wave. For this reason, in the case where the direction of a sub-terahertz wave that enters the imaging target is limited to one direction, or the like, the direction of a reflected wave by the imaging target is also limited, and thus only a limited amount of the reflected wave by the imaging target travels toward the direction of a detector. On the other hand, in the aspect, the imaging target is irradiated with sub-terahertz waves at various angles, and reflected waves resulting from mirror reflection by the imaging target are also reflected at various angles, and thus each sub-terahertz wave mostly travels toward the direction of a detector even after the sub-terahertz wave is mirror-reflected on the surface of the imaging target. Thus, the imaging apparatus according to the aspect is capable of efficiently Irradiating the imaging target with the sub-terahertz wave. Furthermore, efficiently irradiating the imaging target with the sub-terahertz wave increases the amount of the reflected light that enters a first detector. For this reason, the image quality of the image to be generated by the first detector increases.

In addition, for example, the reflector may sandwich the imaging space from the both sides of the pathway.

In this way, since the imaging space is sandwiched by the reflector, the sub-terahertz wave emitted from the light source is diffusely reflected by the reflector one or more times and enters the imaging target. In addition, the sub-terahertz wave emitted from the light source to the reflector is repeatedly diffusely reflected by the reflector, and thus the sub-terahertz wave mostly remains within the imaging space. Thus, the imaging apparatus is capable of efficiently irradiating the imaging target with the sub-terahertz wave.

In addition, for example, the imaging apparatus may include a second light source which emits a sub-terahertz wave onto the reflector; and a second detector which receives a reflected wave of the sub-terahertz wave emitted from the second light source, diffusely reflected by the reflector, and reflected by the imaging target, and generates an image based on the reflected wave received. The second light source and the second detector may be located at a second direction side in a direction opposite to the first direction relative to the center of the imaging space in the direction in which the pathway extends.

In this way, the first detector generates the image of a first direction side surface of the imaging target, and the second detector generates the image of a second direction side surface of the imaging target. Thus, it is possible to generate the images of the both side surfaces of the imaging target in the direction in which the pathway extends.

In addition, for example, the imaging apparatus may further include a light source controller which controls emission of the sub-terahertz wave from each of the first light source and the second light source. The light source controller may: cause the first light source to emit the sub-terahertz wave in a first period and does not cause the second light source to emit the sub-terahertz wave in the first period; and cause the second light source to emit the sub-terahertz wave in a second period different from the first period and does not cause the first light source to emit the sub-terahertz wave in the second period. The first detector may generate an image based on the reflected wave reflected by the imaging target and received in the first period. The second detector may generate an image based on the reflected wave reflected by the imaging target and received in the second period.

In this way, the first light source and the second light source do not emit the sub-terahertz waves at the same time at the timings at which the first detector and the second detector generate the images. Thus, at the time of image generating by the first detector, the sub-terahertz wave resulting from the second light source does not enter at the same time as the entering of the reflected light by the imaging target; and at the time of image generating by the second detector, the sub-terahertz wave resulting from the first light source does not enter at the same time as the entering of the reflected light by the imaging target. Thus, the imaging apparatus is capable of generating images in which images based on the reflected wave by the imaging target are clear.

In addition, for example, one of the first detector or the second detector may perform exposure in the generation of the image based on the reflected wave reflected by the imaging target and received, and immediately after completion of the exposure, a remaining one of the first detector and the second detector may start exposure in the generation of the image based on the reflected wave reflected by the imaging target and received.

In this way, the image generation by the first detector and the image generation by the second detector are performed without a temporal interval. Therefore, since the imaging target can be imaged from the both front and back sides without a temporal interval, it is possible to reduce an unimaged part of the imaging target.

In addition, for example, when the imaging targets passes through the imaging space: the first detector may generate the image based on the reflected wave reflected by the imaging target that passes through an end part at the second direction side of the imaging space in the direction in which the pathway extends; and the second detector may generate the image based on the reflected wave reflected by the imaging target that passes through an end part at the first direction side of the imaging space in the direction in which the pathway extends.

In this way, Images of the imaging target are captured at the both ends of the imaging space in the direction in which the pathway extends. Therefore, even when both the image of the first direction side surface of the imaging target and the image of the second direction side surface of the imaging target are captured, it is possible to reduce the length of the reflector in the direction in which the pathway extends.

In addition, for example, the first detector may receive, at two or more timings, a reflected wave reflected by the imaging target while the imaging target is passing through the imaging space, and generate a plurality of images each based on the reflected wave received at a corresponding one of the two or more timings.

In this way, the images of the imaging target in a plurality of modes are generated while the imaging target is passing through the Imaging space.

In addition, for example, the first detector may generate a plurality of images based on each of the reflected wave reflected by the imaging target located at a second direction side relative to the reflector in the direction in which the pathway extends and the reflected wave reflected by the imaging target that is passing through the imaging space. The second direction side is in the direction opposite to the first direction.

In this way, since the imaging apparatus generates the images of the imaging target before the imaging target enters the Imaging space, it is possible to reduce the length of the reflector in the direction in which the pathway extends.

In addition, for example, the imaging apparatus may include a plurality of first detectors each of which is the first detector. The plurality of first detectors may be arranged in the direction in which the pathway extends.

In this way, in accordance with the forward movement of the imaging target in the direction in which the pathway extends, it is possible to change the first detector which generates the image.

In addition, for example, the imaging apparatus may include a third detector which receives a reflected wave of the sub-terahertz wave emitted from the first light source, diffusely reflected by the reflector, and reflected by the imaging target, and generates an image based on the reflected wave received. The third detector may be located at the first direction side relative to the center of the imaging space in the direction in which the pathway extends. The first detector and the third detector may have different incident directions of the reflected waves reflected by the image target.

In this way, the first detector and the third detector generate the images based on the reflected waves from the different-orientation surfaces of the imaging target.

In addition, for example, the first detector may be located at the first direction side relative to the reflector in the direction in which the pathway extends, and the first light source may be located between the reflector and the first detector.

In this way, the first light source and the first detector are located at the same-direction side of the reflector. In addition, the first light source emits a sub-terahertz wave onto the reflector from the position that is closer to the reflector than the first detector is. Furthermore, the sub-terahertz wave emitted from the first light source and diffusely reflected by the reflector enters the imaging target without traveling toward the first detector. For this reason, it is possible to efficiently use the sub-terahertz wave emitted from the first light source.

In addition, for example, the first light source may include at least one of (i) a plurality of point light sources which are arranged along the reflector when seen from the direction in which the pathway extends and each of which emits a sub-terahertz wave or (ii) a line light source which extends along the reflector when seen from the direction in which the pathway extends and which emits a sub-terahertz wave.

In this way, the first light source is capable of emitting the sub-terahertz wave widely along the reflector when seen from the direction in which the pathway extends.

Hereinafter, embodiments are described specifically with reference to the drawings.

Each of the embodiments described hereinafter indicates a general or specific example. It is to be noted that the numerical values, the shapes, the materials, the elements, the arrangement and connection of the elements, the steps, the order of the steps, etc., described in the following embodiments are mere examples, and do not intend to limit the present disclosure.

In addition, in the DESCRIPTION, the terms such as "parallel" indicating the relationship between elements, the terms such as "planer board" indicating the shape of an element, the terms such as "immediately after" indicating time, and the numerical ranges are expressions which do not indicate precise meaning only and which encompass and cover the substantially equivalent ranges that are, for example, different by approximately several percent.

In addition, each of the drawings is not always illustrated precisely. Throughout the drawings, substantially the same elements are assigned with the same reference signs, and overlapping descriptions are omitted or simplified.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, elements, the arrangement and connection of the elements, steps, the processing order of the steps etc. shown in the following exemplary embodiments are mere examples, and therefore do not limit the scope of the appended Claims and their equivalents. Therefore, among the elements in the following exemplary embodiments, those not recited in any one of the independent claims are described as optional elements.

EMBODIMENT

A Configuration

First, a configuration of an imaging apparatus according to an embodiment is described.

FIG. 1 is a schematic diagram illustrating an appearance of imaging apparatus 10 according to an embodiment. In FIG. 1, elements other than reflector 20 are not illustrated.

As Illustrated in FIG. 1, imaging apparatus 10 is an imaging apparatus which irradiates human 100 with a sub-terahertz wave when human 100 passes through imaging space 102 on pathway 101 sandwiched by reflector 20, and captures images of human 100 based on the reflected wave of the sub-terahertz reflected by human 100. Imaging space 102 is a space covered by reflector 20 out of the space above pathway 101. In addition, for example, imaging apparatus 10 images dangerous objects such as a blade, etc., that human 100 conceals below clothes or the like and carries. Each of the dangerous objects such as the blade, etc., that human 100 conceals below clothes or the like and carries is one example of the imaging target.

Figure 2:
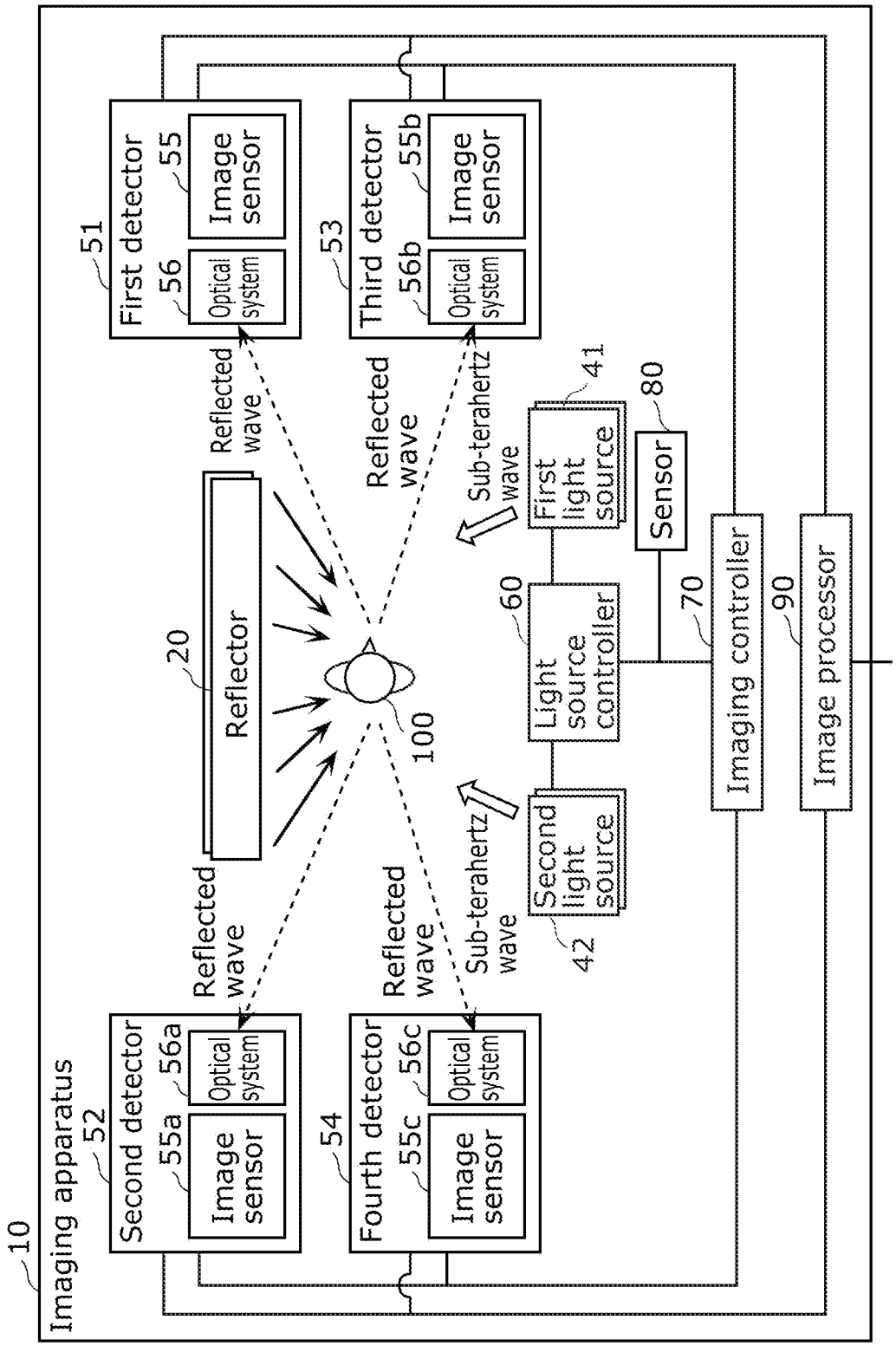
FIG. 2 is a block diagram Illustrating a configuration of the imaging apparatus according to the embodiment.
Figure 3:
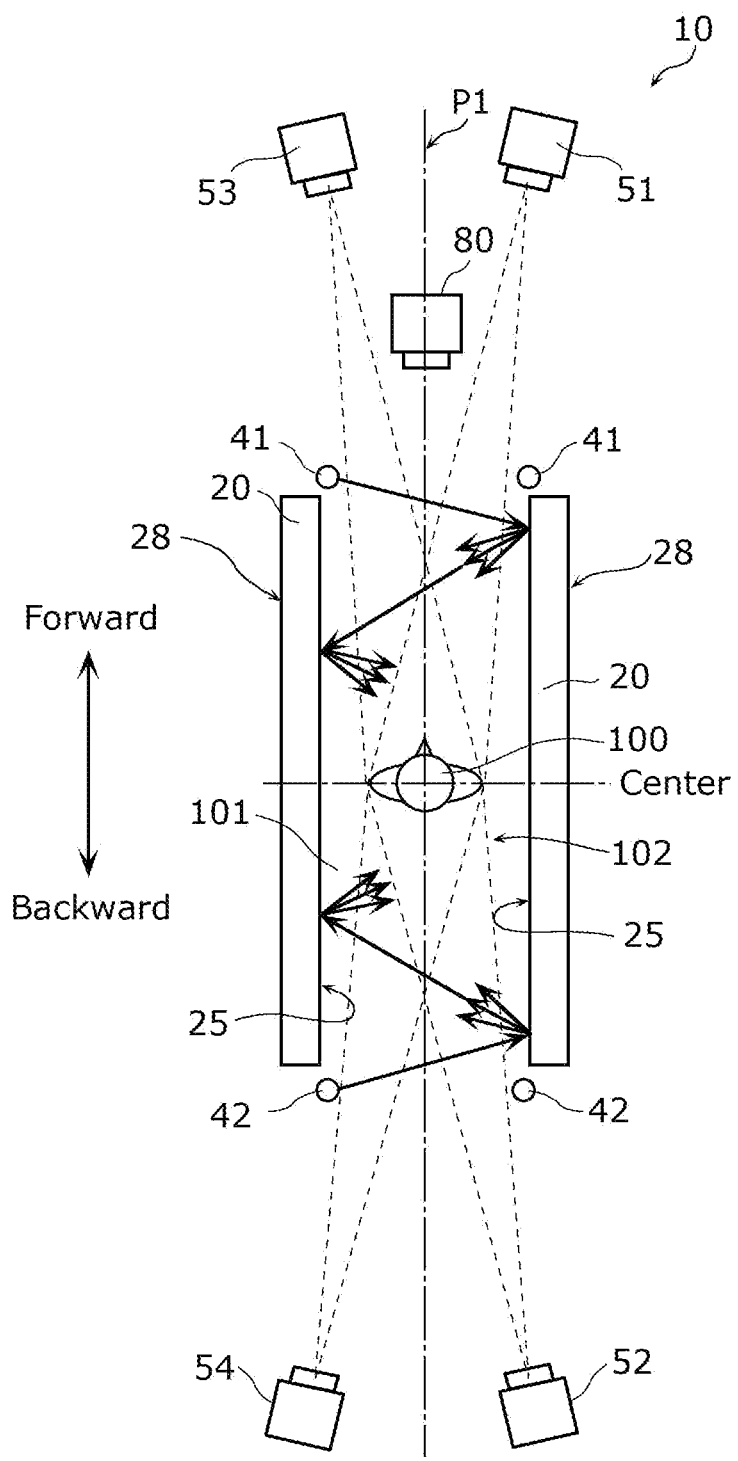
FIG. 3 is a schematic diagram illustrating the imaging apparatus according to the embodiment when seen from above.

Hereinafter, details of each of the elements of imaging apparatus 10 are described. FIG. 2 is a block diagram illustrating a configuration of imaging apparatus 10 according to the embodiment. FIG. 3 is a schematic diagram illustrating imaging apparatus 10 according to the embodiment when seen from above. FIG. 3 illustrates how human 100 passes through imaging space 102. FIG. 3 illustrates, by arrows, examples of the travel directions of the sub-terahertz waves emitted from first light source 41 and second light source 42.

Imaging apparatus 10 includes reflectors 20, first light sources 41, second light sources 42, first detector 51, second detector 52, third detector 53, fourth detector 54, light source controller 60, imaging controller 70, sensor 80, and image processor 90. Hereinafter, first light sources 41 and second light sources 42 may be simply referred to as "light sources". In addition, first detector 51, second detector 52, third detector 53, fourth detector 54 may be simply referred to as "detectors".

Reflector 20 covers the space above pathway 101 that human 100 passes through, specifically imaging space 102, from at least one of the both sides of pathway 101. Covering the space from the at least one of the both sides of pathway 101 specifically means covering the space from the at least one of the both side directions that are two directions perpendicular to the direction in which pathway 101 extends when seen from above pathway 101. In this embodiment, reflector 20 sandwiches imaging space 102 above pathway 101 that human 100 passes through, from the both sides of pathway 101. In other words, reflector 20 covers imaging space 102 from the both sides of pathway 101. Imaging space 102 is a space sandwiched by the inner surface (inner surface 25 to be described later) of reflector 20 out of the space above pathway 101. In this embodiment, a pair of reflectors 20 stand from a floor at the both sides of pathway 101 to face each other. In other words, the pair of reflectors 20 which are two plates are arranged in a positional relationship in which the pair of reflectors 20 sandwich pathway 101 in a top view. In the example illustrated, the pair of reflectors 20 are arranged in a positional relationship in which the pair of reflectors 20 are parallel to each other. In the example illustrated, the pair of reflectors 20 each stand perpendicularly to the floor on which pathway 101 is provided. The heights of reflectors 20 from the floor of pathway 101 are not particularly limited. The heights are for example in a range from 1.5 m to 5.0 m, inclusive. The shapes of reflectors 20 when seen from the direction in which pathway 101 extends are two I-shapes in the case of the pair of reflectors 20, but the shapes of reflectors 20 are not particularly limited. Reflectors 20 are only required to be arranged such that reflectors 20 are present at at least one of the both side directions of imaging space 102. The shapes of reflectors 20 when seen from the direction in which pathway 101 extends may be I-shapes, J-shapes, L-shapes, U-shapes, C-shapes, frame shapes, circular shapes, or the like. For example, imaging apparatus 10 may further include a reflector other than the pair of reflectors 20, or include one reflector having a shape obtained by extending end parts of the pair of reflectors 20 and connects the end parts. It is to be noted that Imaging apparatus 10 may include at least one reflector 20, and for example, may include only one of the pair of reflectors 20.

Each of the pair of reflectors 20 has a plate shape. Each of the pair of reflectors 20 has inner surface 25 and outer surface 28 as two front surfaces when seen from the thickness directions of reflectors 20. The pair of reflectors 20 are arranged such that inner surface 25 of one of the pair of reflectors 20 and inner surface 25 of the other one of the pair of reflectors 20 face each other. In short, inner surfaces 25 are imaging space 102 side surfaces of reflectors 20. For example, each of the pair of reflectors 20 has a plate shape with inner surface 25 and outer surface 28 parallel to inner surface 25. In other words, the thickness of each reflector 20 is even. Each of the plan-view shapes of the pair of reflectors 20 is not particularly limited, and for example is rectangular.

Each reflector 20 diffusely reflects a sub-terahertz wave. Specifically, reflector 20 diffusely reflects a sub-terahertz wave that enters from at least the imaging space 102 side (that is, the inside of each of the pair of reflectors 20), Reflectors 20 are located between first light sources 41 and second light sources 42. As illustrated in FIG. 3, the sub-terahertz waves emitted from first light source 41 and second light source 42 are diffusely reflected one or more times at least one of the pair of reflectors 20 and enters human 100. In this way, by means of reflectors 20 that diffusely reflect the sub-terahertz waves sandwiching imaging space 102, the sub-terahertz waves that have entered imaging space 102 mostly remain within imaging space 102, and human 100 is irradiated with the sub-terahertz waves at various angles.

Furthermore, since each reflector 20 has a plate shape, it is possible to configure a thinner and smaller imaging apparatus 10 compared with the case in which members such as spherical mirrors for concentrating sub-terahertz waves onto human 100 are used for reflection of the sub-terahertz waves.

Next, a specific configuration of reflector 20 is described.

Figure 4:
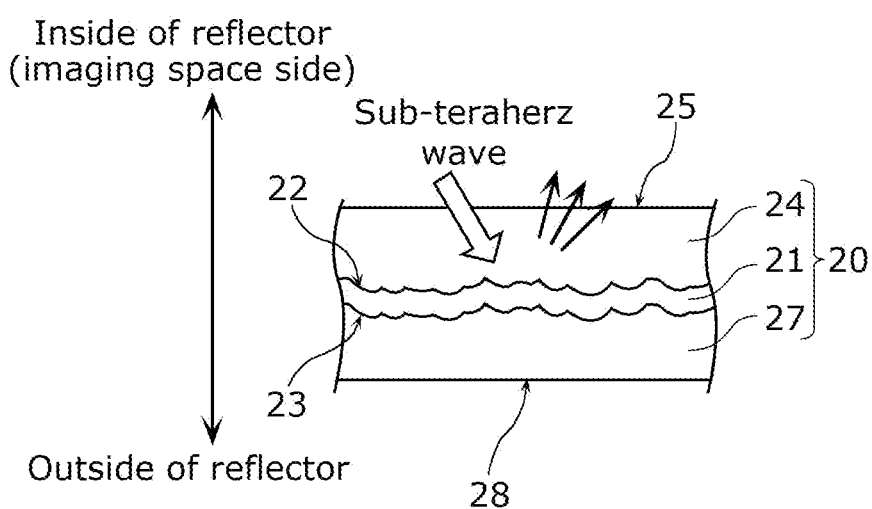
FIG. 4 is a schematic diagram Illustrating a cross-sectional structure of a reflector according to the embodiment.

FIG. 4 is a schematic diagram illustrating a cross-sectional structure of reflector 20. FIG. 4 is a diagram in which the cross-section of reflector 20 is enlarged. It is to be noted that, in FIG. 4, diagonal hatching indicating a cross-section is not illustrated for clear vision.

Reflector 20 includes reflective member 21 and two cover members 24 and 27. Reflector 20 has a structure in which cover member 24, reflective member 21, and cover member 27 are stacked from an imaging space 102 side in this sequence.

Reflective member 21 is a sheet-shaped member which diffusely reflects a sub-terahertz wave. Reflective member 21 is located between cover member 24 and cover member 27. Reflective member 21 includes two main surfaces 22 and 23 as two front surfaces when seen from the thickness direction of reflective member 21. Main surfaces 22 and 23 are each concave-convex surface which diffusely reflects a sub-terahertz wave. Main surface 22 is located at the imaging space 102 side In reflective member 21, and main surface 23 is located at the side opposite to the imaging space 102 side in reflective member 21. Both two main surfaces 22 and 23 in reflective member 21 are respectively covered by cover members 24 and 27. Specifically, main surface 22 located at the imaging space 102 side in reflective member 21 is covered by cover member 24, and main surface 23 located at the side opposite to the imaging space 102 side in reflective member 21 is covered by cover member 27. Thus, main surfaces 22 and 23 do not constitute the surfaces of reflector 20, and are not exposed. In this way, although the concave-convex surface may become contact with human 100 when main surfaces 22 and 23 which are concave-convex surfaces are exposed, reflective member 21 is protected because main surfaces 22 and 23 are respectively covered by cover members 24 and 27.

For example, in each of main surfaces 22 and 23 which are the concave-convex surfaces have average length RSm of a roughness curve element that is greater than or equal to the wavelength of a sub-terahertz wave that is emitted from each of first light source 41 and second light source 42. Specifically, for example, main surfaces 22 and 23 have an average length RSm of a roughness curve element that is in a range from 0.15 mm to 0.3 mm, inclusive. In this way, the sub-terahertz wave is efficiently diffusely reflected by main surfaces 22 and 23. In the example illustrated in FIG. 4, the concave-convex shapes of main surfaces 22 and 23 match each other. It is not always necessary that the concave-convex shapes of main surfaces 22 and 23 match each other. In addition, main surface 22 at the imaging space 102 side in reflective member 21 needs to be a concave-convex surface, but it is also excellent that main surface 23 is a flat surface.

Reflective member 21 is configured with a metal or a conductive member such as a conductive oxide. Examples of the metal are listed as follows: a pure metal (single metal) including at least one of copper, aluminum, nickel, iron, stainless, silver, gold, platinum, or the like, or an alloy, etc. Examples of the conductive oxide are listed as follows: a transparent conductive oxide such as ITO (Indium Tin Oxide), IZO (InZnO; Indium Zinc Oxide), AZO (AlZnO: Aluminum Zinc Oxide), FTO (Florine-doped Tin Oxide), $SnO_2$, $TiO_2$, and $ZnO_2$.

Cover members 24 and 27 each transmit a sub-terahertz wave. For example, cover members 24 and 27 each transmit 50% or more of a sub-terahertz wave entering from the thickness direction of reflector 20. For example, cover members 24 and 27 each may transmit 80% or more, or 90% or more of a sub-terahertz wave entering from the thickness direction of reflector 20.

Cover member 24 is located at the imaging space 102 side of reflective member 21, and covers main surface 22. The surface of cover member 24 that is located at the side opposite to the reflective member 21 side in cover member 24 constitutes inner surface 25 of reflector 20. Inner surface 25 is a flat surface without concaves and convexes unlike main surface 22. In this way, even when human 100 who passes through pathway 101 collides with inner surface 25 of reflector 20, human 100 is prevented from colliding with the concave-convex surface (that is main surface 22) of reflective member 21, and human 100 and main surface 22 are protected. In addition, since inner surface 25 of reflector 20 is the flat surface, it is easy to clean reflector 20.

Cover member 27 is located at the side opposite to the imaging space 102 side of reflective member 21, and covers main surface 23. The surface of cover member 27 that is located at the side opposite to the reflective member 21 side in cover member 27 constitutes outer surface 28 of reflector 20. Outer surface 28 is a flat surface without concaves and convexes unlike main surface 23. Thus, it is easy to clean reflector 20.

The material for cover members 24 and 27 is only required to be a material with which cover members 24 and 27 can be configured to have and maintain the shapes as described above. As the material for cover members 24 and 27, a resin material, or the like is used for example. For example, the resin material may be a transparent amorphous resin material that transmits visible light, or may be a crystalline resin material that diffusely reflects visible light.

Reflector 20 is formed using the method described below, for example. Cover member 24 is formed by firstly forming a resin material using a mold having a concave-convex surface, or by performing machine processing on a plate-shaped resin material to form concaves and convexes on the surface of the resin material, and forming film-shaped reflective member 21 onto formed cover member 24, by vapor deposition, spraying, or the like. Next, by covering formed film-shaped reflective member 21 by applying, hot-melt pasting, or the like of a resin material of cover member 27, reflector 20 is obtained. Alternatively, reflector 20 is obtained by performing machine processing on a metal plate as a material of reflective member 21 to form concaves and convexes on the surface of the metal plate, covering the metal plate with concaves and convexes through machine processing by applying, hot-melt plating, insert-molding, or the like a resin material of each of cover members 24 and 27. Alternatively, cover members 24 and 27 may be formed using a 3D printer.

As illustrated in FIG. 4, with the above-described configuration, the sub-terahertz wave that enters from inside (that is, the imaging space 102 side) of one of a pair of reflectors 20 enters cover member 24, is diffusely reflected by main surface 22 of reflective member 21, and enters, via inner surface 25, the imaging space 102 side at various angles.

For example, the pair of reflectors 20 are mutually the same in configuration and material. It is to be noted that the pair of reflectors 20 may be different in one of configuration or material.

Elements of imaging apparatus 10 are continuously described with reference to FIGS. 2 and 3 again.

First light sources 41 and second light sources 42 are each a light source which emits a sub-terahertz wave onto reflector 20. Specifically, each of first light sources 41 and second light sources 42 emits a sub-terahertz wave onto at least one of inner surfaces 25 of the pair of reflectors 20. In addition, as illustrated in FIG. 3, first light source 41 and second light source 42 emit sub-terahertz waves onto reflector 20 so that parts of the sub-terahertz waves respectively emitted by first light source 41 and second light source 42 are diffusely reflected by reflectors 20 two or more times. In addition, the parts of the sub-terahertz waves respectively emitted by first light source 41 and second light source 42 may directly enter human 100.

For example, first light sources 41 and second light sources 42 emit the sub-terahertz waves under control of light source controller 60. In addition, first light sources 41 and second light sources 42 in use may always emit sub-terahertz waves, or may emit sub-terahertz waves at certain time intervals.

For example, first light sources 41 and second light sources 42 are supported by supporting members, or the like which are not illustrated in the drawings. For example, first light sources 41 and second light sources 42 are each implemented by, for example, a publicly-known sub-terahertz wave generating element or a circuit that supplies current to a sub-terahertz wave generating element.

First light sources 41 are located at the forward direction side relative to the center of imaging space 102 in the direction in which pathway 101 extends. The center of imaging space 102 is the center of the space that is formed by being sandwiched by reflectors 20. In the example illustrated in FIG. 3, first light sources 41 are located at the forward direction side relative to reflectors 20 in the direction in which pathway 101 extends. Hereinafter, the forward direction in the direction in which pathway 101 extends may be simply referred to as "forward", and the backward direction in the direction in which pathway 101 extends may be simply referred to as "backward". In addition, in the DESCRIPTION, the "forward direction" and "backward direction" are terms which do not refer to the forward and backward in the movement direction of human 100 on pathway 101 but refer to relative directions. Specifically, one direction out of the directions in the direction in which pathway 101 extends is referred to as the "forward direction", and the other direction that is opposite to the one direction is referred to as the "backward direction". In the DESCRIPTION, the forward direction is one example of a first direction, and the backward direction is one example of a second direction, First light source 41 emits a sub-terahertz wave onto inner surface 25 of reflector 20 from the forward direction side.

In addition, first light sources 41 are located near the forward-direction side end part of each of the pair of reflectors 20, and are apart from reflectors 20. In addition, first light sources 41 are located between (i) first detector 51 and third detector 53 and (ii) reflectors 20. In this way, first light source 41, first detector 51, and third detector 53 are located at the same direction side relative to reflectors 20, specifically at the forward direction side. In addition, first light source 41 emits a sub-terahertz wave onto reflector 20 from the position closer to reflector 20 than first detector 51 and third detector 53 are. Furthermore, the sub-terahertz wave emitted from first light source 41 and diffusely reflected by reflector 20 enters human 100 without traveling toward a first detector 51 side and a third detector 53 side. For this reason, it is possible to efficiently use the sub-terahertz wave emitted from first light source 41.

It is to be noted that first light source 41 may be located, for example, in imaging space 102, and may be located at the forward direction side relative to first detector 51 and third detector 53.

Figure 5A:
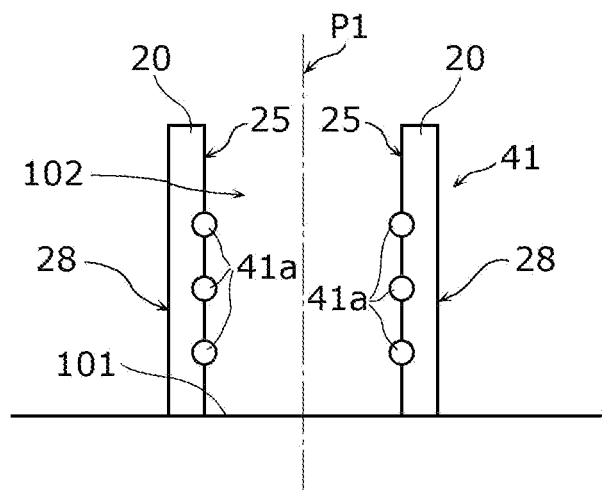
FIG. 5A is a schematic diagram illustrating one example in the case where first light sources according to the embodiment are seen from a forward direction.

First light source 41 includes point light sources which emit a sub-terahertz wave, for example. FIG. 5A is a schematic diagram illustrating one example when first light source 41 is seen from the forward direction. In FIG. 5A, elements other than first light sources 41 and reflectors 20 are not illustrated. As illustrated in FIG. 5A, first light source 41 includes a plurality of light sources 41a which are arranged along reflectors 20 when seen from the direction in which pathway 101 extends and which emit sub-terahertz waves. In this embodiment, the plurality of light sources 41a are arranged along the direction in which the pair of reflectors 20 stand. In FIG. 5A, three point light sources 41a are arranged along a forward-direction side end part of one of the pair of reflectors 20, and three point light sources 41a are arranged along a forward-direction side end part of the other of the pair of reflectors 20. In other words, first light sources 41 each include a set of point light sources 41a arranged along the direction in which a corresponding one of the pair of reflectors 20 stands. The number of point light sources 41 arranged is not particularly limited, and may be two, or four or more. In the example illustrated in FIG. 5A, the sets of point light sources 41a are arranged symmetrically to virtual plane P1. Virtual plane P1 is a vertical plane which passes through the center of imaging space 102 and along the direction in which pathway 101 extends. It is to be noted that a plurality of point light sources 41a may be arranged only on one of the pair of reflectors 20.

Figure 5B:
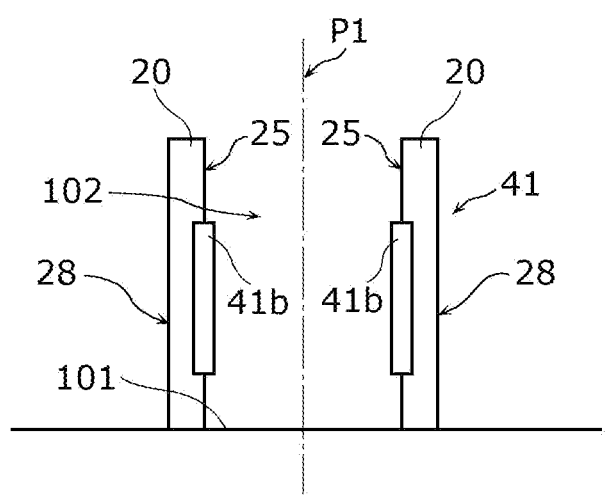
FIG. 5B is a schematic diagram Illustrating another example in the case where first light sources according to the embodiment are seen from the forward direction.

In addition, first light source 41 may include other light sources instead of the plurality of point light sources 41a. FIG. 5B is a schematic diagram illustrating another example when first light sources 41 are seen from the forward direction. In FIG. 5B, elements other than first light sources 41 and reflectors 20 are not illustrated. As Illustrated in FIG. 5B, first light sources 41 each include line light source 41b which is disposed along a corresponding one of reflectors 20 when seen from the direction in which pathway 101 extends and which emits sub-terahertz waves. In this embodiment, line light sources 41b are arranged along the direction in which the pair of reflectors 20 stand. In FIG. 5B, one line light source 41b is disposed to extend along the forward-direction side end part of one of the pair of reflectors 20, and one line light source 41b is disposed to extend along the forward-direction side end part of the other of the pair of reflectors 20. In other words, first light sources 41 include the pair of line light sources 41b. The number of line light sources 41b each arranged to extend along the forward-direction side end part of the corresponding one of the pair of reflectors 20 may be two or more. In the example illustrated in FIG. 5B, the pair of line light sources 41b are arranged symmetrically to virtual plane P1. It is to be noted that line light source 41b may be disposed only on one of the pair of reflectors 20.

In this way, first light sources 41 include at least one of (i) the sets of point light sources 41a which are arranged respectively along reflectors 20 when seen from the direction in which pathway 101 extends and each of which emits a sub-terahertz wave, or (ii) line light sources 41b which are arranged respectively along reflectors 20 when seen from the direction in which pathway 101 extends and each of which emits a sub-terahertz wave. In this way, first light sources 41 are capable of emitting the sub-terahertz waves widely along reflectors 20 when seen from the direction in which the pathway extends. As a result, human 100 is efficiently irradiated with the sub-terahertz waves.

Second light sources 42 are located at a backward direction side relative to the center of imaging space 102 in the direction in which pathway 101 extends. In the example illustrated in FIG. 3, second light sources 42 are located at the backward direction side relative to reflectors 20. Second light source 42 emits a sub-terahertz wave onto inner surface 25 of reflector 20 from the backward of reflector 20.

In addition, second light source 41 is located near the backward-direction side end part of each of the pair of reflectors 20, and is apart from reflectors 20. In addition, second light source 42 is located between (i) second detector 52 and fourth detector 54 and (ii) reflectors 20.

It is to be noted that second light source 42 may be located, for example, in imaging space 102, and may be located at the backward direction side relative to second detector 52 and fourth detector 54. In addition, when imaging apparatus 10 does not capture an image of the back surface of human 100, second light sources 42 do not always need to be provided to imaging apparatus 10.

For example, second light source 42 includes at least one of point light sources or a line light source each of which emits a sub-terahertz wave. The point light sources or the line light source included in second light source 42 are the same as the one(s) included in first light source 41. For this reason, the point light sources or the line light source included in second light source 42 are/is explained by replacing first light source 41 with second light source 42 and replacing the forward direction with the backward direction in the descriptions given with respect to FIGS. 5A and 5B.

With reference to FIGS. 2 and 3 again, elements of imaging apparatus 10 are continuously described.

First detector 51 receives a reflected wave of the sub-terahertz wave which has been emitted from first light source 41, diffusely reflected by reflector 20, and reflected by human 100. First detector 51 generates an image based on the reflected wave received. First detector 51 outputs the image generated to image processor 90. Image generating by a detector such as first detector 51 is also referred to as "imaging or image capturing". First detector 51 performs exposure at the timing at which first light source 41 is emitting a sub-terahertz wave and generates an image.

First detector 51 is located at a forward direction side relative to the center of imaging space 102 in the direction in which pathway 101 extends. In the example illustrated in FIG. 3, first detector 51 is located at the forward direction side relative to reflectors 20 in the direction in which pathway 101 extends. First detector 51 captures an image of the front surface of human 100. For example, first detector 51 is supported by a supporting member, or the like which is not illustrated in the drawings.

First detector 51 includes image sensor 55 and optical system 56.

Image sensor 55 receives a reflected wave of the sub-terahertz wave which has been emitted from first light source 41, or the like, diffusely reflected by reflector 20, and reflected by human 100. Image sensor 55 detects the intensity of the reflected wave received, and generates an image based on the intensity detected. Specifically, during the exposure, Image sensor 55 converts an image of the sub-terahertz wave reflected from the imaging target into an electrical signal according to the intensity. Image sensor 55 then generates an image based on the electrical signal converted. The image generated by image sensor 55 is output to image processor 90.

The sub-terahertz wave is mirror-reflected on a human, a metal, or the like, and passes through clothes, bags, etc. For this reason, image sensor 55 receives a reflected wave which has been mirror-reflected (i) on a body part of human 100 and (ii) from an area included within an angle range in which image sensor 55 can receive the wave. For example, a reflected wave by human 100 which passes through a range indicated by broken lines which extend from first detector 51 in FIG. 3 enters image sensor 55. In addition, when human 100 conceals and carries a blade, or the like, image sensor 55 receives a reflected wave which has been mirror-reflected (i) by the blade concealed and carried and (ii) from the area included within the angle range in which image sensor 55 can receive the wave.

Image sensor 55 is configured with, for example, pixels each including a detector element for a sub-terahertz wave, a peripheral circuit, etc.

Optical system 56 receives a reflected wave of the sub-terahertz wave which has been emitted from first light source 41, or the like, diffusely reflected by at least one reflector 20, and reflected by human 100. Optical system 56 is configured to, for example, include at least one lens. It is to be noted that first detector 51 does not always need to include optical system 56, and that a reflected wave may directly enter Image sensor 55.

Second detector 52 receives a reflected wave of the sub-terahertz wave which has been emitted from second light source 42, diffusely reflected by at least one reflector 20, and reflected by human 100. Second detector 52 generates an image based on the reflected wave received. Second detector 52 outputs the image generated to image processor 90. Second detector 52 performs exposure at the timing at which second light source 42 is emitting a sub-terahertz wave and generates an image.

Second light source 52 is located at a backward direction side relative to the center of imaging space 102 in the direction in which pathway 101 extends. In the example illustrated in FIG. 3, second detector 52 is located at the backward direction side relative to reflectors 20. Second detector 52 captures an image of the back surface of human 100. For example, second detector 52 is supported by a supporting member, or the like which is not illustrated in the drawings. In this way, imaging apparatus 10 includes first detector 51 and second detector 52, which makes it possible to generate images of both front and back surfaces of human 100.

Second detector 52 includes image sensor 55a and optical system 56a. Image sensor 55a and optical system 56a are identical to image sensor 55 and optical system 56 described above, and thus detailed descriptions thereof are omitted.

It is to be noted that, when imaging apparatus 10 does not capture an image of the back surface of human 100, second detector 52 do not always need to be provided to imaging apparatus 10.

Third detector 53 receives a reflected wave of the sub-terahertz wave which has been emitted from first light source 41, diffusely reflected by at least one reflector 20, and reflected by human 100. Third detector 53 generates an image based on the reflected wave received. Third detector 53 outputs the image generated to image processor 90. Third detector 53 performs exposure at the timing at which first light source 41 is emitting a sub-terahertz wave and generates an image.

Third detector 53 is located at the forward direction side relative to the center of imaging space 102 in the direction in which pathway 101 extends. In the example illustrated in FIG. 3, third detector 53 is located at the forward direction side relative to reflectors 20. For example, third detector 53 is supported by a supporting member, or the like which is not illustrated in the drawings. First detector 51 and third detector 53 are arranged at different positions in a top view of pathway 101. First detector 51 and third detector 53 have different incidence directions of a reflected wave by human 100. In this way, first detector 51 and third detector 53 generate the images based on the reflected waves from the different-orientation surfaces of human 100. For this reason, for example, it is possible to reduce blind spots for imaging apparatus 10 in the case where, for example, imaging apparatus 10 detects a dangerous object such as a blade that human 100 conceals and carries.

For example, first detector 51 and third detector 53 have a positional relationship in which first detector 51 and third detector 53 are arranged symmetrically to virtual plane P1. For this reason, the incidence direction of the reflected wave to first detector 51 and the Incidence direction of the reflected wave to third detector 53 are symmetrical to virtual plane P1. In addition, first detector 51 and third detector 53 are arranged in the direction perpendicular to the direction in which pathway 101 extends in a top view of pathway 101.

Third detector 53 includes image sensor 55b and optical system 56b. The same descriptions of image sensor 55 and optical system 56 can be applied to image sensor 55b and optical system 56b, and thus detailed descriptions thereof are omitted.

Fourth detector 54 receives a reflected wave of the sub-terahertz wave which has been emitted from second light source 42, diffusely reflected by reflector 20, and reflected by human 100, Fourth detector 54 generates an image based on the reflected wave received. Fourth detector 54 outputs the image generated to image processor 90. Fourth detector 54 performs exposure at the timing at which second light source 42 is emitting a sub-terahertz wave and generates an image.

Fourth detector 54 is located at a backward direction side relative to the center of Imaging space 102 in the direction in which pathway 101 extends. In the example illustrated in FIG. 3, fourth detector 54 is located at the backward direction side relative to reflectors 20. For example, fourth detector 54 is supported by a supporting member, or the like which is not illustrated in the drawings. The positional relationship between second detector 52 and fourth detector 54 is the same as the positional relationship between first detector 51 and third detector 53. The positional relationship between second detector 52 and fourth detector 54 is explained by replacing first detector 51 with second detector 52 and replacing third detector 53 with fourth detector 54 in the description regarding the positional relationship between first detector 51 and third detector 53.

Fourth detector 54 includes image sensor 55c and optical system 56c. The same descriptions of image sensor 55 and optical system 56 can be applied to image sensor 55c and optical system 56c, and thus detailed descriptions thereof are omitted.

It is to be noted that at least one of third detector 53 or fourth detector 54 does not always provided to imaging apparatus 10.

Light source controller 60 controls emission of a sub-terahertz wave from each of first light source 41 and second light source 42. Light source controller 60 controls, for example, a timing for emission of a sub-terahertz wave from each of first light source 41 and second light source 42. For example, light source controller 60: in a first period, causes first light source 41 to emit a sub-terahertz wave and does not cause second light source 42 to emit a sub-terahertz wave; and in a second period different from the first period, causes second light source 42 to emit a sub-terahertz wave and does not cause first light source 41 to emit a sub-terahertz wave.

For example, light source controller 60 controls emission of the sub-terahertz wave from each of first light source 41 and second light source 42, based on, for example, a signal obtained from imaging controller 70, sensor 80, etc. For example, light source controller 60 includes a processor and a memory, and is implemented by means of the processor executing the program recorded on the memory.

Imaging controller 70 controls a timing at which each detector generates an image. For example, imaging controller 70 causes first detector 51 and third detector 53 to generate images in synchronization with each other, and causes second detector 52 and fourth detector 54 to generate images in synchronization with each other. Alternatively, for example, imaging controller 70 causes each detector to generate an image based on a timing of emission of a sub-terahertz wave from each of first light source 41 and second light source 42. Imaging controller 70 may cause each detector to generate an image based on a signal from sensor 80, or the like. For example, imaging controller 70 includes a processor and a memory, and is implemented by means of the processor executing the program recorded on the memory.

Sensor 80 is a sensor for detecting presence of human 100. For example, sensor 80 outputs a signal indicating presence of human 100 to light source controller 60 and imaging controller 70. For example, sensor 80 is a camera that captures moving images. Sensor 80 may be a sensor of another kind such as a human sensor. The number of sensors 80 included in imaging apparatus 10 is one in the example illustrated in FIG. 3, but imaging apparatus 10 may include a plurality of sensors 80.

Upon receiving an image from each detector, image processor 90 outputs the received image to outside, and together with the output, performs image processing on the received image, and then outputs the result of the image processing to outside.

The image processing that is performed by image processor 90 may be, for example, a process of determining whether the image output from the detector includes an object having a predetermined feature (for example, an object having a feature of a blade), and when determining that the image output from the detector includes an object having the predetermined feature, outputting a predetermined detection signal (for example, an alert indicating that an image of the object having the feature of the blade has been captured). Alternatively, image processor 90 may perform a synthesis process on an image received from each detector. For example, image processor 90 includes a processor and a memory, and is implemented by means of the processor executing the program recorded on the memory.

It is to be noted that imaging apparatus 10 does not always include image processor 90, and each detector may output an image to an external image processing apparatus. Alternatively, the function of Image processor 90 may be provided to each detector.

Here, irradiation modes of sub-terahertz waves in imaging apparatus 10 according to this embodiment are described with reference to FIG. 3. The sub-terahertz waves (indicated by arrows in FIG. 3) emitted from the light sources to reflectors 20 are diffusely reflected by reflectors 20 and enter human 100 because imaging space 102 is covered by reflectors 20 from the sides of imaging space 102. In this way, inner surfaces 25 of reflectors 20 function as surface light sources, and human 100 is Irradiated with the sub-terahertz waves in a comparatively wide range at various angles. Thus, Imaging apparatus 10 is capable of efficiently irradiating human 100 with the sub-terahertz waves. In addition, in this embodiment, since reflectors 20 are plates facing each other to sandwich imaging space 102, and thus the sub-terahertz waves emitted from the light sources are diffusely reflected one or more times by reflectors 20 and enter human 100. Furthermore, most of the sub-terahertz waves emitted from the light sources to reflectors 20 are repeatedly diffusely reflected in imaging space 102, and thus mostly remain within imaging space 102 located on pathway 101 that human 100 passes through. Thus, imaging apparatus 10 is capable of efficiently irradiating human 100 with the sub-terahertz waves.

Furthermore, since comparatively wide surface range of human 100 is irradiated with the sub-terahertz at the various angles, reflected waves of the sub-terahertz waves reflected in the comparatively wide surface range of human 100 enter each detector. In addition, since the sub-terahertz waves emitted from the light sources to reflectors 20 mostly remain within imaging space 102, the amount of the reflected wave that enters each detector increases. For this reason, the image quality of the image to be generated by each detector increases. This results in, for example, increase in the detection accuracy in the case where imaging apparatus 10 is used to detect a dangerous object such as a blade that human 100 conceals and carries.

An Operation Example

Next, an example of an operation that is performed by imaging apparatus 10 according to the embodiment is described.

In the following descriptions of the example of the operation, an operation is described which imaging apparatus 10 performs for capturing an image of human 100 who passes through imaging space 102 from the backward direction to the forward direction. FIGS. 6A, 6B, 6C, and 6D are diagrams for explaining the example of the operation that is performed by imaging apparatus 10 according to the embodiment. FIGS. 6A, 6B, 6C, and 6D each illustrate a diagram when imaging apparatus 10 is seen from above. For clear vision, sensor 80 is not illustrated in FIGS. 6A, 6B, 6C, and 6D. In addition, in each of FIGS. 6A, 6B, 6C, and 6D, first light source 41 and second light source 42 are hatched with dots when they are emitting sub-terahertz waves, and are not hatched with dots when they are not emitting sub-terahertz waves. In addition, in each of FIGS. 6A, 6B, 6C, and 6D, examples of traveling directions of sub-terahertz waves reflected from reflectors 20 are schematically indicated by solid lines. This applies to each of diagrams for explaining examples of operations in respective variations indicated below.

Figure 6A:
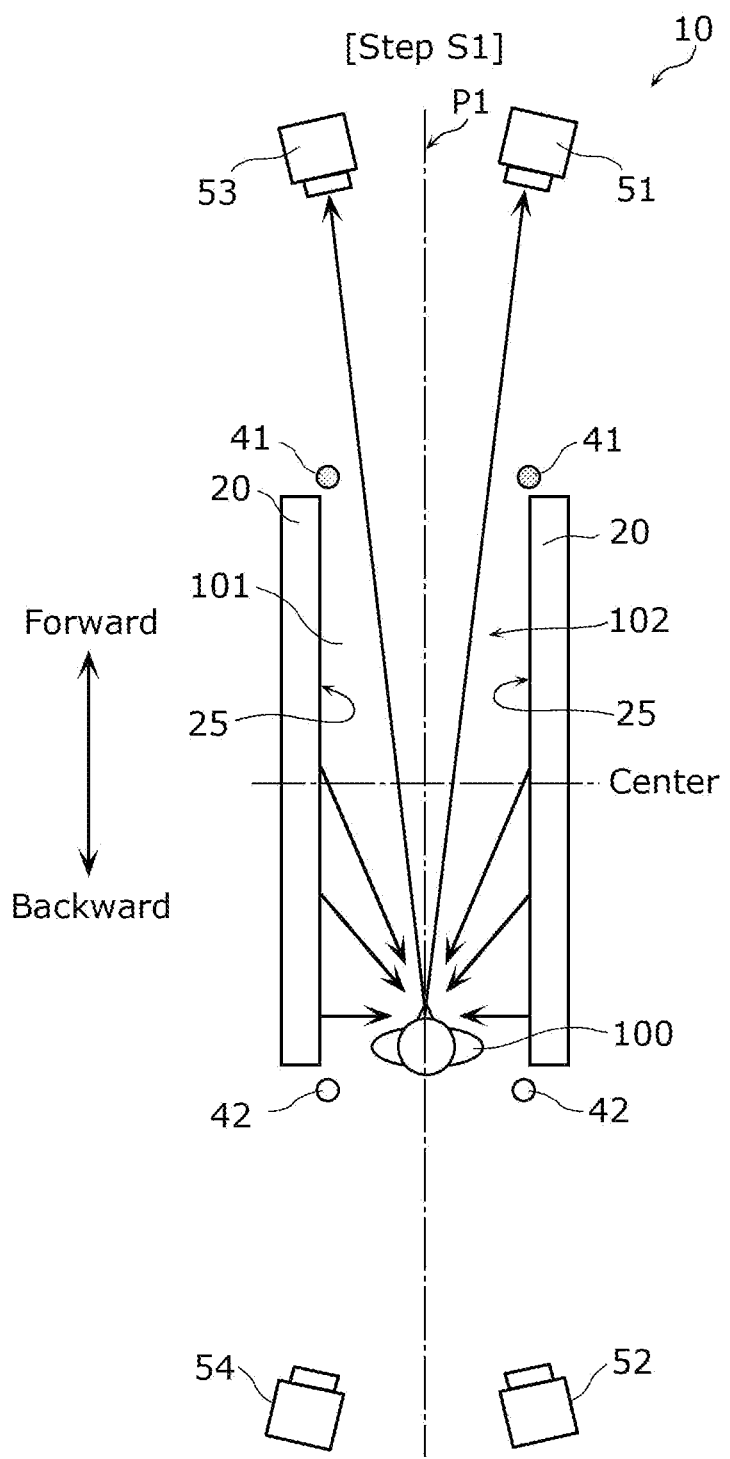
FIG. 6A is a diagram for explaining an example of an operation that is performed by the imaging apparatus according to the embodiment.

First, as illustrated in FIG. 6A, in Step S1, human 100 enters imaging space 102, and passes through a backward-direction side end part of imaging space 102. Upon detecting that human 100 is present at the backward-direction side end part of imaging space 102, light source controller 60 causes first light source 41 to emit a sub-terahertz wave. For example, light source controller 60 detects the presence of human 100 by receiving, from sensor 80, a signal indicating that human 100 is present at the backward-direction side end part of imaging space 102. In addition, at this time, light source controller 60 does not cause second light source 42 to emit a sub-terahertz wave.

The sub-terahertz wave emitted from first light source 41 is diffusely reflected by reflector 20 one or more times, and enters human 100 via inner surface 25. Specifically, the sub-terahertz wave from inner surface 25 located at the forward direction side relative to human 100 enters human 100. The reflected wave of the sub-terahertz wave that has entered human 100 and has been reflected by human 100 enters first detector 51. First detector 51 receives a reflected wave by human 100. Imaging controller 70 causes first detector 51 to generate an image based on the reflected wave received by first detector 51 at a timing at which light source controller 60 causes first light source 41 to emit the sub-terahertz wave. In other words, first detector 51 generates the image based on the reflected wave by human 100 who is passing through the backward-direction side end part of imaging space 102. In this way, first detector 51 generates the image of the front surface of human 100. First detector 51 outputs the image generated to image processor 90. For example, light source controller 60 detects that generation of the image by first detector 51 has been completed, and causes first light source 41 to turn off.

In Step S1, first detector 51 generates the image based on the received reflected wave by human 100 in a first period in which light source controller 60 causes first light source 41 to emit a sub-terahertz wave and does not cause second light source 42 to emit a sub-terahertz wave. If second light source 42 emits a sub-terahertz wave at the time when first light source 41 emits a sub-terahertz wave, the sub-terahertz wave emitted from second light source 42 located backward of human 100 may enter first detector 51 at the same time when the reflected wave by human 100 enters. For this reason, an image by the reflected wave by human 100 in the image generated by first detector 51 may become unclear. In contrast, in Step S1, since first detector 51 generates the image based on the reflected wave by human 100 received in the first period in which second light source 42 does not emit a sub-terahertz wave, the Image generated based on the reflected wave by human 100 is clear.

Figure 6B:
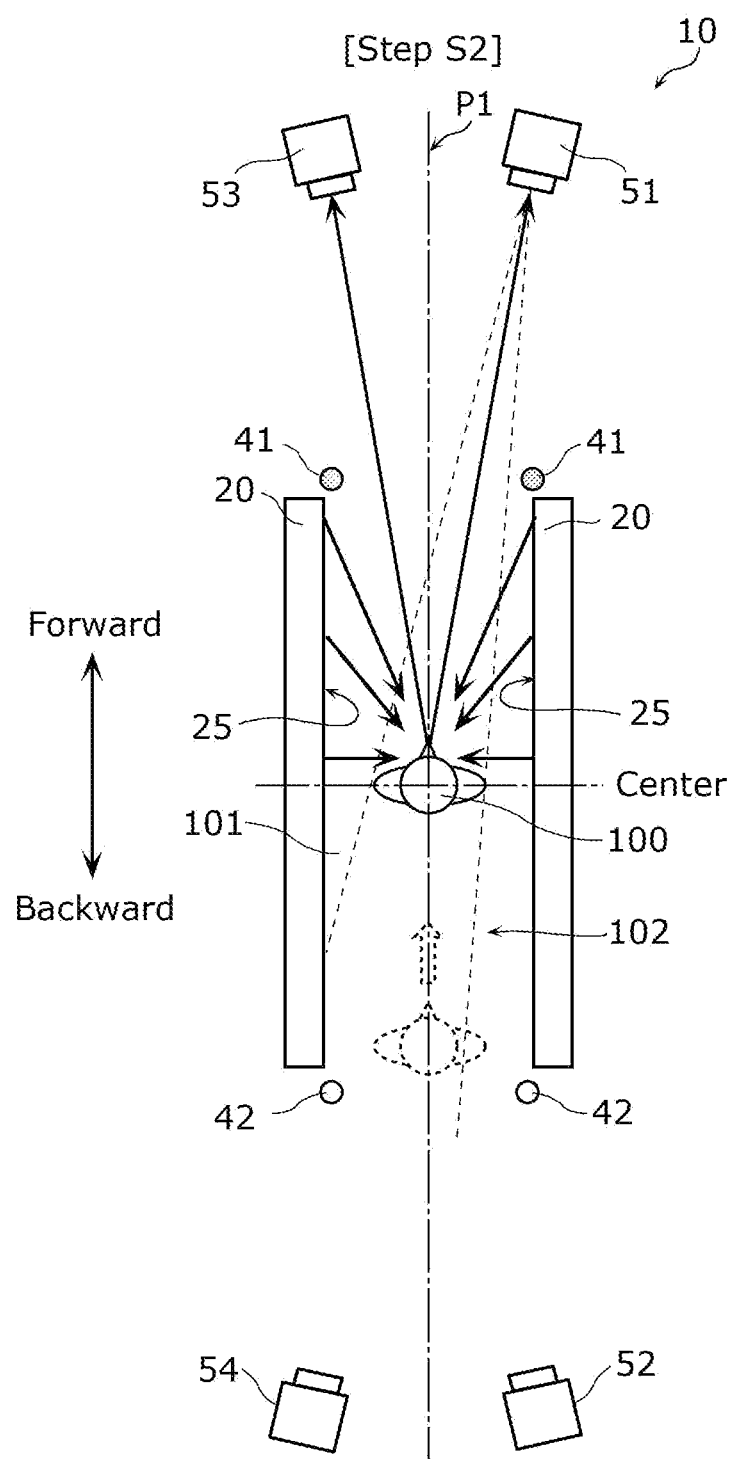
FIG. 6B is a diagram for explaining an example of an operation that is performed by the imaging apparatus according to the embodiment.

Next, as illustrated in FIG. 6B, in Step S2, human 100 proceeds forward from the position in Step S1, and is present at the center part of imaging space 102 in the direction in which pathway 101 extends. Upon detecting that human 100 is present at the center part of imaging space 102, light source controller 60 causes first light source 41 to emit a sub-terahertz wave. For example, light source controller 60 detects the presence of human 100 by receiving, from sensor 80, a signal indicating that human 100 is present at the center part of imaging space 102 in the direction in which pathway 101 extends. In addition, at this time, light source controller 60 does not cause second light source 42 to emit a sub-terahertz wave. It is to be noted that light source controller 60 may cause first light source 41 to emit a sub-terahertz wave after a predetermined time elapsed from the time of generation of the image by first detector 51 in Step S1, instead of detecting the presence of human 100. The predetermined period is, for example, set to time corresponding to one or two steps of human 100.

The sub-terahertz wave emitted from first light source 41 is diffusely reflected by at least one reflector 20 one or more times, and enters human 100 via inner surface 25. The reflected wave of the sub-terahertz wave that has entered human 100 and has been reflected by human 100 enters first detector 51. First detector 51 receives a reflected wave by human 100. Imaging controller 70 causes first detector 51 to generate an image based on the reflected wave received by first detector 51 at a timing at which light source controller 60 causes first light source 41 to emit a sub-terahertz wave. In this way, first detector 51 generates the image of the front surface of human 100. First detector 51 outputs the image generated to image processor 90. For example, light source controller 60 detects that generation of the image by first detector 51 has been completed, and causes first light source 41 to turn off.

In this way, in Step S1 to Step S2, first detector 51 receives the reflected wave by human 100 at two or more timings while human 100 is passing through Imaging space 102. First detector 51 then generates a plurality of images based on the reflected waves received respectively. In this way, the images of human 100 in two or more modes are generated while human 100 is passing through imaging space 102. For this reason, for example, an image including a part which has not imaged in the only one image is generated, which can increase detection accuracy, etc., in the case where imaging apparatus 10 is used to detect a dangerous object, etc., that human 100 conceals and carries.

In addition, also in Step S2 as in Step S1, first detector 51 generates an image based on a reflected wave by human 100 received in the first period. In addition, in Step S2, the range in which the reflected wave by human 100 enters first detector 51 is a range indicated by broken lines which extend from first detector 51 in FIG. 6B. In the range, second light source 42 and a part of reflector 20 are located. For this reason, when second light source 42 is emitting a sub-terahertz wave, the sub-terahertz wave stemming from second light source 42 particularly mostly enters first detector 51. For this reason, the effect of making the image by the reflected wave by human 100 clear by means of first detector 51 generating the image is remarkable in the first period in which second light source 42 does not emit a sub-terahertz wave.

It is to be noted that, in Step S1, light source controller 60 may cause first light source 41 to keep emitting a sub-terahertz wave until the generation of the image by first detector 51 in Step 2 is completed, without causing first light source 41 to turn off. In this case, for example, upon detecting that human 100 is present at the center part of imaging space 102, imaging controller 70 causes first detector 51 to generate an image.

Figure 6C:
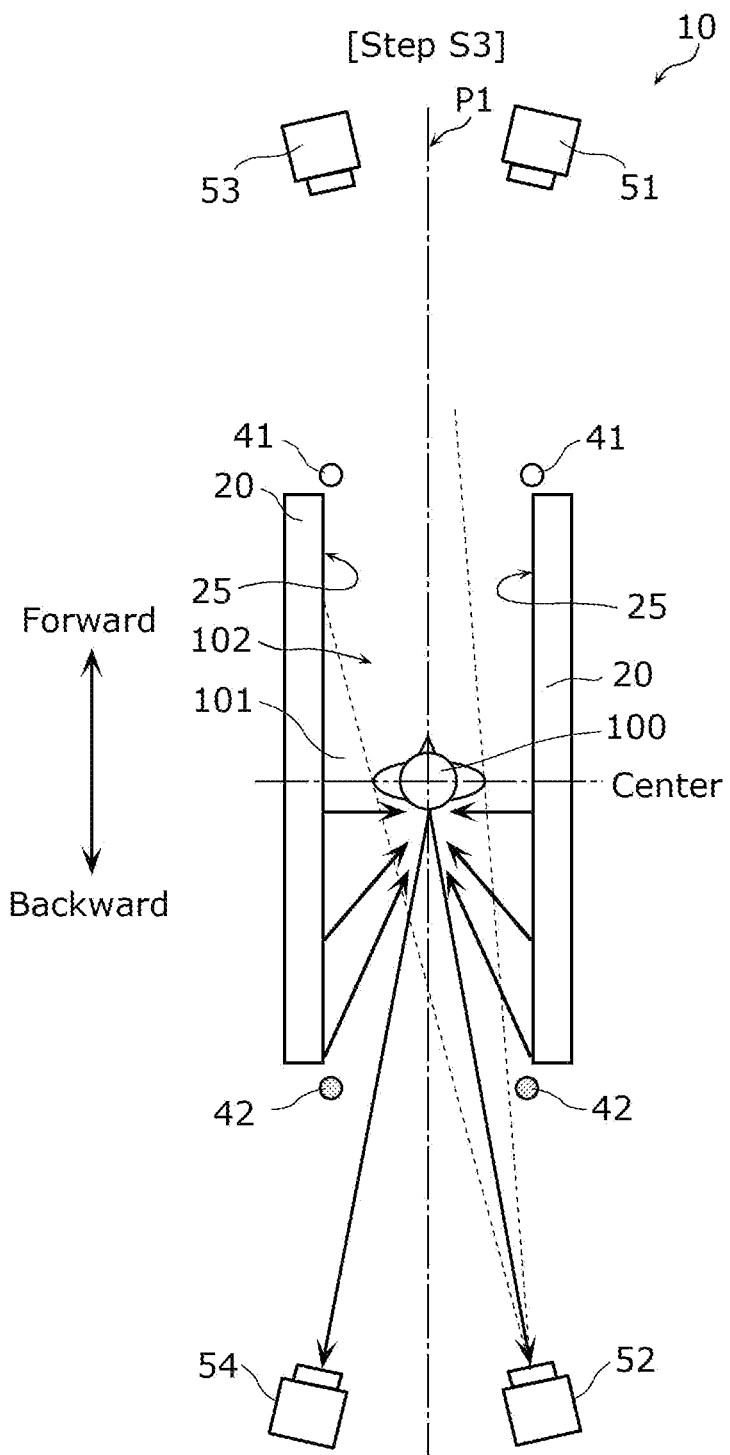
FIG. 6C is a diagram for explaining an example of an operation that is performed by the imaging apparatus according to the embodiment.

Next, in Step S3 Immediately after Step S2, as Illustrated in FIG. 6C, light source controller 60 causes second light source 42 to emit a sub-terahertz wave. Specifically, light source controller 60 causes second light source 42 to emit the sub-terahertz wave immediately after completion of exposure in the generation of the image by first detector 51 in Step S2. Light source controller 60 obtains a signal indicating a timing at which the generation of the image by first detector 51 ends, through imaging controller 70. For example, the signal is a signal indicating the end of the exposure by image sensor 55. In addition, at this time, light source controller 60 does not cause first light source 41 to emit a sub-terahertz wave.

The sub-terahertz wave emitted from second light source 42 is diffusely reflected by at least one reflector 20 one or more times, and enters human 100 via inner surface 25. Specifically, the sub-terahertz wave from inner surface 25 located at the backward direction side relative to human 100 enters human 100. The reflected wave of the sub-terahertz wave that has entered human 100 and has been reflected by human 100 enters second detector 52. Second detector 52 receives the reflected wave by human 100. Imaging controller 70 causes second detector 52 to start generation of an image, at a timing at which light source controller 60 causes second light source 42 to emit a sub-terahertz wave, that is, Immediately after completion of the exposure in the generation of the image by first detector 51 in Step 2. In other words, second detector 52 starts the exposure in the generation of the image based on the received reflected wave by human 100, immediately after the completion of the exposure in the generation of the image based on the reflected wave by human 100 received in first detector 51 in Step S2. In this way, second detector 52 captures the image of the back surface of human 100, immediately after the capturing of the image in first detector 51 in Step S2. Second detector 52 outputs the image generated to image processor 90. For example, light source controller 60 detects that generation of the image by second detector 52 has been completed, and causes second light source 42 to turn off.

In this way, in Steps S2 and Step S3, the imaging by first detector 51 and imaging by second detector 52 are performed without a temporal interval. In this way, since images of human 100 can be captured from both the front and back surfaces of human 100 without a temporal interval, the body area of human 100 which is not Imaged at the time of imaging is reduced, which can increase the detection accuracy in the case where imaging apparatus 10 is used to detect a dangerous object, etc., that human 100 conceals and carries.

In Step S3, second detector 52 generates the image based on the received reflected wave by human 100 in a second period in which light source controller 60 causes second light source 42 to emit a sub-terahertz wave and does not cause first light source 41 to emit a sub-terahertz wave. If first light source 41 emits a sub-terahertz wave at the time when second light source 42 emits a sub-terahertz wave, the sub-terahertz wave emitted from first light source 41 located at the forward direction side relative to human 100 may enter second detector 52 at the same time when the reflected wave by human 100 enters. For this reason, an image by the reflected wave by human 100 in the image generated by second detector 52 may become unclear. In contrast, in Step S3, since second detector 52 generates the image based on the received reflected wave by human 100 in the second period in which first light source 41 does not emit a sub-terahertz wave, the image generated based on the reflected wave by human 100 becomes clear. In addition, in Step S3, the range in which the reflected wave by human 100 enters second detector 52 is a range indicated by broken lines which extend from second detector 52 in FIG. 6C. In the range, first light source 41 and parts of reflectors 20 are located. For this reason, when second light source 42 is emitting a sub-terahertz wave, the sub-terahertz wave stemming from first light source 41 is particularly mostly enters second detector 52. For this reason, the effect of making the image by the reflected wave by human 100 clear by means of first detector 52 generating the image is remarkable in the second period in which first light source 41 does not emit a sub-terahertz wave.

It is to be noted that, in Step S2 and Step S3, second detector 52 may generate an image firstly, instead of first detector 51. In other words, in the descriptions in Step S2 and S3, operations in which first light source 41 is replaced with second light source 42, and first detector 51 is replaced with second detector 52 may be performed.

Figure 6D:
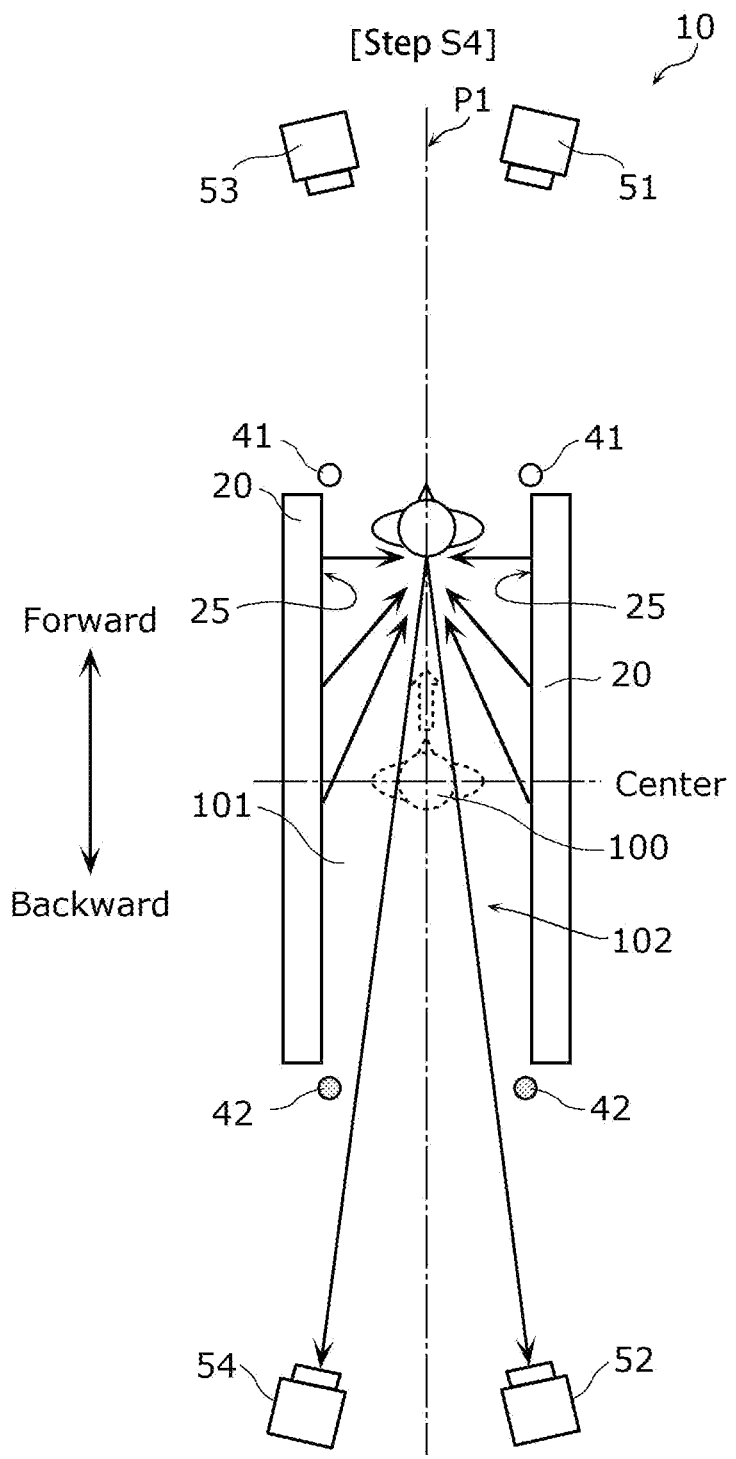
FIG. 6D is a diagram for explaining an example of an operation that is performed by the imaging apparatus according to the embodiment.

Next, as illustrated in FIG. 6D, in Step S4, human 100 proceeds forward from the position in Step S3, and is located at the forward-direction side end part of imaging space 102. In other words, human 100 passes through the forward-direction side end part of imaging space 102. Upon detecting that human 100 is present at the forward-direction side end part of imaging space 102, light source controller 60 causes second light source 42 to emit a sub-terahertz wave. For example, light source controller 60 detects the presence of human 100 by receiving, from sensor 80, a signal indicating that human 100 is present at the forward-direction side end part of imaging space 102. In addition, at this time, light source controller 60 does not cause first light source 41 to emit a sub-terahertz wave.

The sub-terahertz wave emitted from second light source 42 is diffusely reflected by reflector 20 one or more times, and enters human 100 via inner surface 25. The reflected wave of the sub-terahertz wave that has entered human 100 and reflected by human 100 enters second detector 52. Second detector 52 receives the reflected wave by human 100. Imaging controller 70 causes second detector 52 to generate an image based on the reflected wave received by second detector 52 at a timing at which light source controller 60 causes second light source 42 to emit a sub-terahertz wave. In other words, second detector 52 generates the image based on the reflected wave by human 100 who is passing through the forward-direction side end part of imaging space 102. In this way, second detector 52 captures an image of the back surface of human 100. Second detector 52 outputs the image generated to image processor 90. For example, light source controller 60 detects that generation of the image by second detector 52 has been completed, and causes second light source 42 to turn off.

In this way, in Step S3 to Step S4, second detector 52 receives the reflected wave by human 100 at two or more timings while human 100 is passing through imaging space 102. Second detector 52 then generates a plurality of images based on the reflected waves received respectively. In this way, the same effect is obtained as provided by the image generation by first detector 51 in Step S1 to Step S2.

In addition, also in Step S4 as in Step S3, second detector 52 generates an image based on a reflected wave by human 100 received in the second period. Thus, as in Step S3, the effect that the image generated based on the reflected wave by human 100 becomes clear is obtained.

In addition, in the example of the operation by imaging apparatus 10, for example, imaging controller 70 causes first detector 51 and third detector 53 to operate in synchronization with each other, and causes second detector 52 and fourth detector 54 to operate in synchronization with each other. In other words, third detector 53 performs the operation similar to the operation performed by first detector 51, and fourth detector 54 performs the operation similar to the operation performed by second detector 52. For this reason, the operations by third detector 53 and fourth detector 54 are explained by replacing first detector 51 with third detector 53 and replacing second detector 52 with fourth detector 54. This also applies in each of the operations in the variations to be described later.

Image processor 90 may perform image processing for synthesizing the image generated by first detector 51 and the image generated by third detector 53. Image processor 90 may perform image processing for synthesizing the image generated by second detector 52 and the image generated by fourth detector 54.

Although each detector generates the image of human 100 at the position illustrated in each of FIGS. 6A, 6B, 6C, and 6D in the example of the operation by imaging apparatus 10, it is to be noted that the position of human 100 is not limited thereto. The position of human 100 at the time when each detector generates an image of human 100 is only necessary to be a position at which human 100 is irradiated with a sub-terahertz wave from the detector side via inner surface 25. The position at which an image of human 100 is captured in each of Step S2 and Step S3 is a position at which either an inner surface 25 part at the forward direction side and an inner surface 25 part at the backward direction side relative to human 100 can irradiate human 100 with a sub-terahertz wave. The position at which the image of human 100 is captured in each of Step S2 and Step S3 is, for example, the center part of imaging space 102 in the direction in which pathway 101 extends.

In addition, during Step S1 to Step S4, the respective detectors may generate images sequentially, and may output, to image processor 90, images selected as being generated at the timings in Step S1 to Step S4 from among the images generated sequentially. Alternatively, the respective detectors may generate images sequentially, and may output all the images generated sequentially to image processor 90. In this case, for example, image processor 90 selects the images generated at the timings in Step S1 to Step S4 among the received images, and performs image processing on the selected images.

Variation 1

Next, an imaging apparatus according to Variation 1 of the embodiment is described.

The imaging apparatus according to Variation 1 of the embodiment is mainly different from the imaging apparatus according to the embodiment in that imaging by first detector and imaging by second detector are performed two or more times without a temporal interval. The imaging apparatus according to Variation 1 of the embodiment is also different from the imaging apparatus according to the embodiment in that the lengths of reflectors in the direction in which a pathway extends and the distance between the first detector and the second detector are longer. The differences from the embodiment are mainly described hereinafter, and descriptions of the common points are omitted or simplified.

Figure 7:
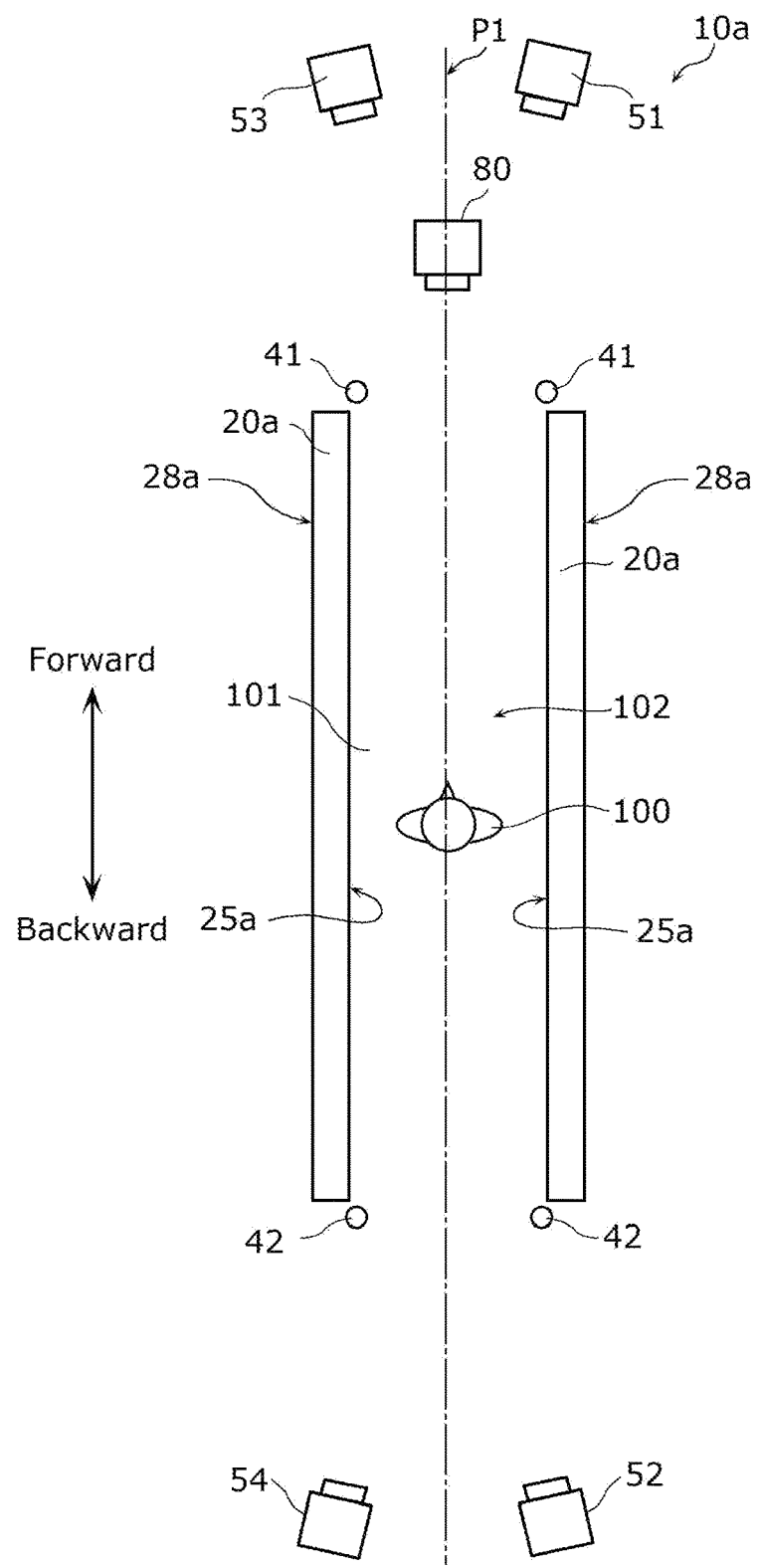
FIG. 7 is a schematic diagram illustrating the Imaging apparatus according to Variation 1 of the embodiment when seen from above.

FIG. 7 is a schematic diagram Illustrating imaging apparatus 10a according to Variation 1 of the embodiment when seen from above. As illustrated in FIG. 7, imaging apparatus 10a is configured to include reflectors 20a instead of reflectors 20 provided in imaging apparatus 10. In imaging apparatus 10a, elements other than reflectors 20a are identical to elements in imaging apparatus 10.

Reflector 20a covers the space above pathway 101 that human 100 passes through, from at least one of the both sides of pathway 101. In this variation, reflectors 20a sandwich imaging space 102 above pathway 101 that human 100 passes through from the both sides of pathway 101. In this variation, a pair of reflectors 20a stand from the floor at the both sides of pathway 101 that human 100 passes through to face each other. Each of the pair of reflectors 20a has inner surface 25a and outer surface 28a as two front surfaces when seen from the thickness direction of reflector 20a. Reflectors 20a are configured similarly to reflectors 20 except the point that the lengths in the direction in which pathway 101 extends are longer than those of reflectors 20. Thus, specific descriptions are omitted.

Next, an example of an operation that is performed by imaging apparatus 10a according to the variation is described.

In the following descriptions of the example of the operation, an operation is described which imaging apparatus 10a performs for capturing an image of human 100 who passes through imaging space 102 from the backward direction to the forward direction. FIGS. 8A, 8B, 8C, and 8D are diagrams for explaining the example of the operation that is performed by imaging apparatus 10a according to the variation.

Figure 8A:
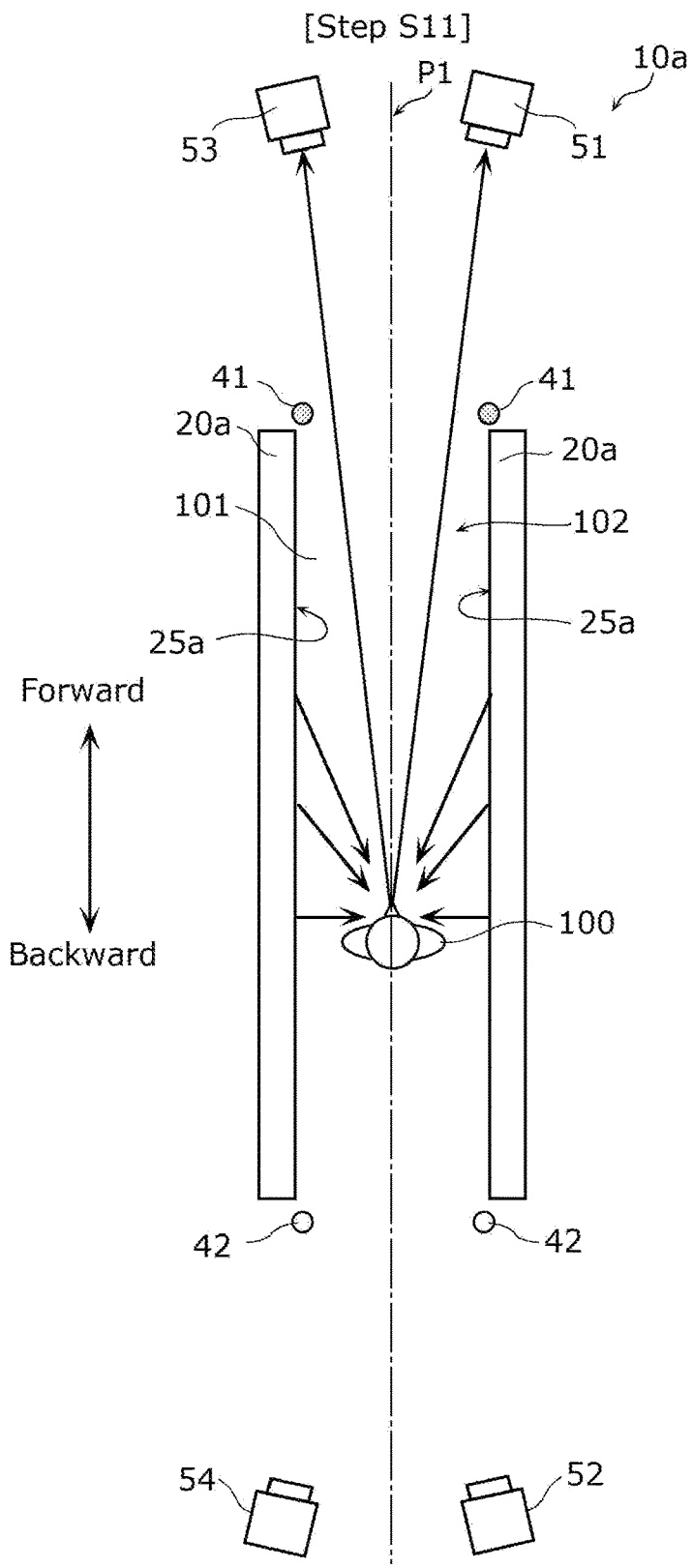
FIG. 8A is a diagram for explaining an example of an operation that is performed by the imaging apparatus according to Variation 1 of the embodiment.

First, as illustrated in FIG. 8A, in Step S11, human 100 enters imaging space 102, and passes through the backward direction side in imaging space 102. Upon detecting that human 100 is present at the backward direction side in imaging space 102, light source controller 60 causes first light source 41 to emit a sub-terahertz wave. In addition, at this time, light source controller 60 does not cause second light source 42 to emit a sub-terahertz wave.

The sub-terahertz wave emitted from first light source 41 is diffusely reflected by at least one reflector 20a one or more times, and enters human 100 via inner surface 25a. The operation by imaging apparatus 10a hereinafter is the same as in Step S2 described above, and thus specific descriptions are omitted. In other words, first detector 51 generates the image based on the reflected wave by human 100 who is passing through the backward direction side in Imaging space 102.

Figure 8B:
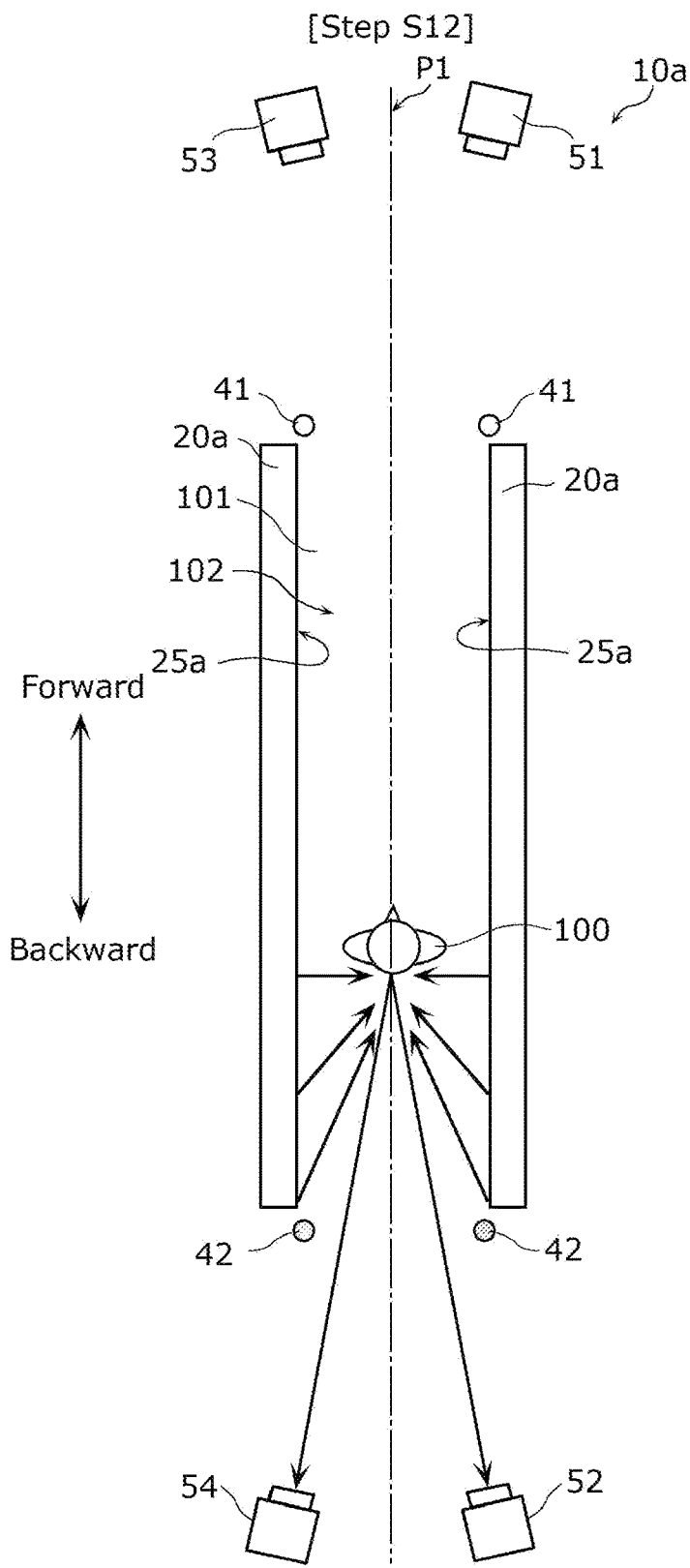
FIG. 8B is a diagram for explaining an example of an operation that is performed by the imaging apparatus according to Variation 1 of the embodiment.

Next, in Step S12 immediately after Step S11, as illustrated in FIG. 8B, light source controller 60 causes second light source 42 to emit a sub-terahertz wave. Specifically, light source controller 60 causes second light source 42 to emit the sub-terahertz wave immediately after completion of exposure in the generation of the image by first detector 51 in Step S11. In addition, at this time, light source controller 60 does not cause first light source 41 to emit a sub-terahertz wave.

The sub-terahertz wave emitted from second light source 42 is diffusely reflected by at least one reflector 20a one or more times, and enters human 100 via inner surface 25a. The operation by imaging apparatus 10a hereinafter is the same as in Step S3, and thus specific descriptions are omitted. In this way, imaging controller 70 causes second detector 52 to generate the image Immediately after the completion of the exposure in the generation of the image by first detector 51 in Step S11. In other words, second detector 52 captures the image of the back surface of human 100, immediately after the capturing of the image in first detector 51 in Step S11.

Figure 8C:
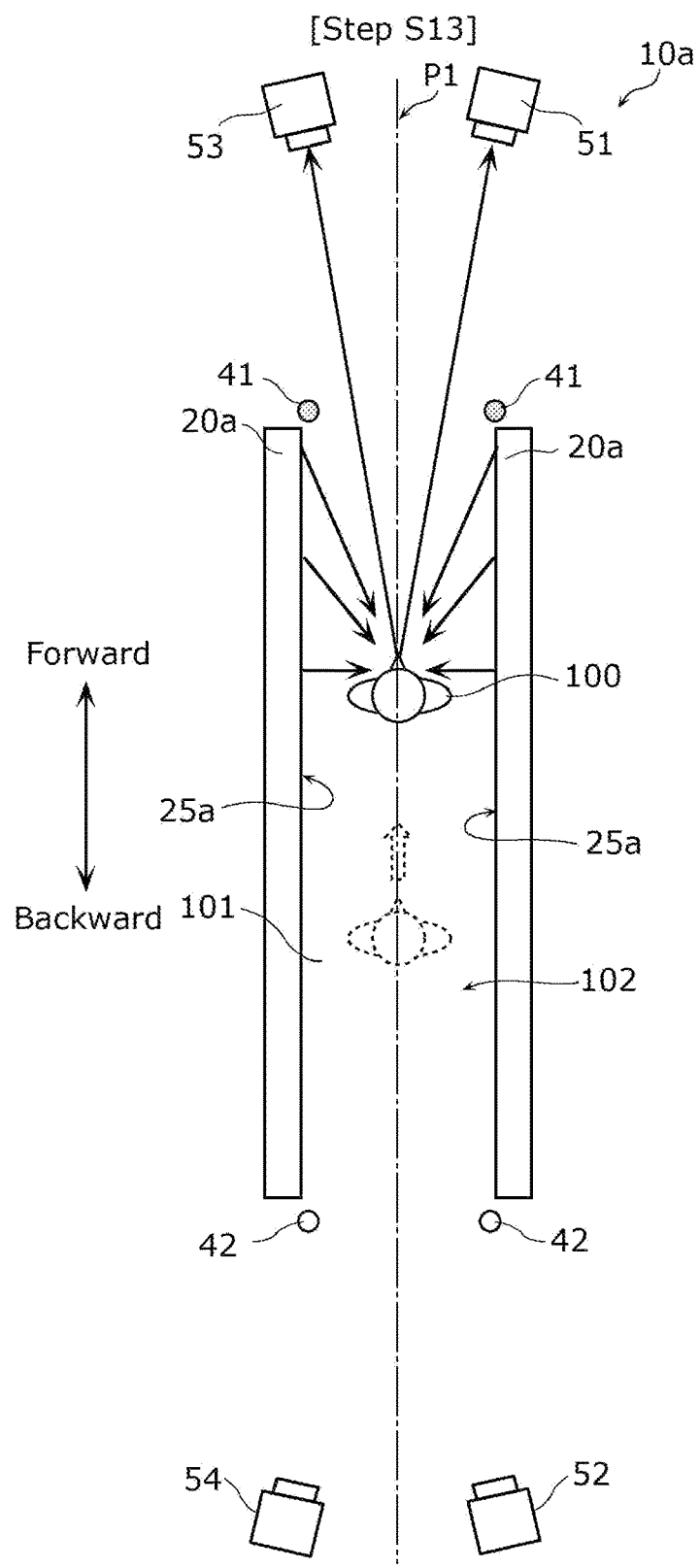
FIG. 8C is a diagram for explaining an example of an operation that is performed by the imaging apparatus according to Variation 1 of the embodiment.

Next, as illustrated in FIG. 8C, in Step S13, human 100 proceeds forward from the position in Step S12, and is located at the forward direction side in imaging space 102. In other words, human 100 passes through the forward direction side in imaging space 102. Upon detecting that human 100 is present at the forward direction side in imaging space 102, light source controller 60 causes first light source 41 to emit a sub-terahertz wave. In addition, at this time, light source controller 60 does not cause second light source 42 to emit a sub-terahertz wave.

The sub-terahertz wave emitted from first light source 41 is diffusely reflected by reflector 20a one or more times, and enters human 100 via inner surface 25a. The operation by imaging apparatus 10a hereinafter is the same as in Step S2, and thus specific descriptions are omitted. In this way, first detector 51 generates the image based on the reflected wave by human 100 who is passing through the forward direction side in imaging space 102.

Figure 8D:
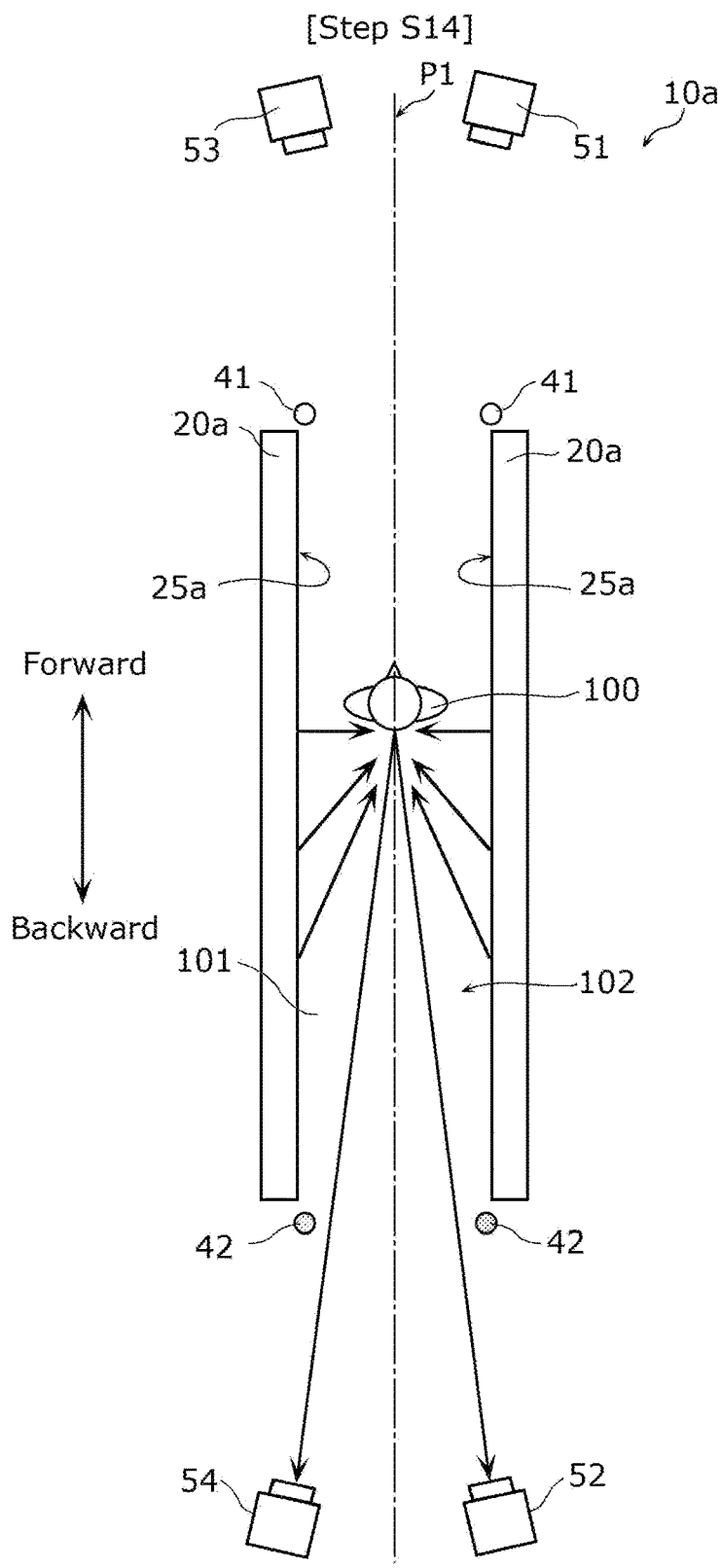
FIG. 8D is a diagram for explaining an example of an operation that is performed by the imaging apparatus according to Variation 1 of the embodiment.

Next, in Step S14 immediately after Step S13, as illustrated in FIG. 8D, light source controller 60 causes second light source 42 to emit a sub-terahertz wave. Specifically, light source controller 60 causes second light source 42 to emit the sub-terahertz wave immediately after completion of exposure in the generation of the image by first detector 51 in Step S13.

The sub-terahertz wave emitted from second light source 42 is diffusely reflected by at least one reflector 20a one or more times, and enters human 100 via inner surface 25a. The operation by imaging apparatus 10a hereinafter is the same as in Step S3, and thus specific descriptions are omitted. In this way, imaging controller 70 causes second detector 52 to generate the image immediately after the completion of the exposure in the generation of the image by first detector 51 in Step S13. In other words, second detector 52 captures the image of the back surface of human 100, immediately after the capturing of the image in first detector 51 in Step S13.

As described above, in Steps S11 and Step S12, the imaging by first detector 51 and imaging by second detector 52 are performed without a temporal interval. In addition, also in Steps S13 and Step S14, the imaging by first detector 51 and imaging by second detector 52 are performed without a temporal interval. In this way, images of human 100 can be captured from both forward and backward direction sides relative to human 100 two or more times without a temporal interval while human 100 is passing through imaging space 102, and images of human 100 are generated in a plurality of modes while human 100 is passing through imaging space 102. For this reason, it is possible to further increase the detection accuracy in the case where imaging apparatus 10a is used to detect a dangerous object, or the like that human 100 conceals and carries.

In addition, since the images of the both front and back surfaces of human 100 are captured at the same position of human 100 in Step S11 and Step S12, reflectors 20a need to be located at the forward and backward direction sides relative to human 100 in order to irradiate human 100 with sub-terahertz waves equivalent to the ones in the example of the operation according to the embodiment. This also applies in Step S13 and Step S14. For this reason, in order to capture the images of human 100 from both the forward and backward direction sides two or more times without a temporal interval, reflectors 20a are longer than reflectors 20 by the length of an inner surface 25a part for irradiating human 100 with terahertz waves.

Variation 2

Next, an imaging apparatus according to Variation 2 of the embodiment is described.

The imaging apparatus according to Variation 2 of the embodiment is mainly different from the imaging apparatus according to the embodiment in that each of a first detector and a second detector captures an Image in the case where a human is located at one position. The imaging apparatus according to Variation 2 of the embodiment is also different from the imaging apparatus according to the embodiment in that the lengths of reflectors in the direction in which a pathway extends and the distance between the first detector and the second detector are shorter. The differences from the embodiment are mainly described hereinafter, and descriptions of the common points are omitted or simplified.

Figure 9:
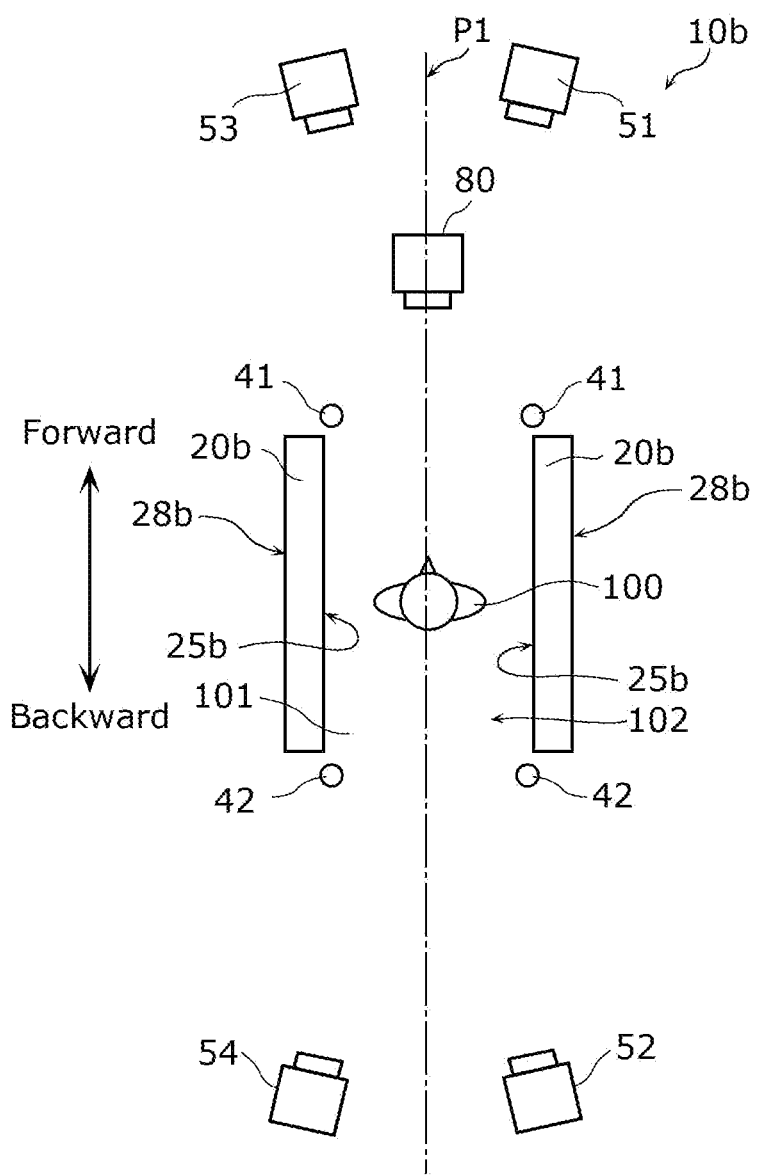
FIG. 9 is a schematic diagram Illustrating the imaging apparatus according to Variation 2 of the embodiment when seen from above.

FIG. 9 is a schematic diagram illustrating imaging apparatus 10b according to the variation of the embodiment when seen from above. As illustrated in FIG. 9, imaging apparatus 10b is configured to include reflectors 20b instead of reflectors 20 provided in imaging apparatus 10. In imaging apparatus 10b, elements other than reflectors 20b are identical to elements in imaging apparatus 10.

Reflector 20b covers the space above pathway 101 that human 100 passes through, from at least one of the both sides of pathway 101. In this variation, reflectors 20b sandwich imaging space 102 above pathway 101 that human 100 passes through from the both sides of pathway 101. In this variation, a pair of reflectors 20b stand from the floor at the both sides of pathway 101 that human 100 passes through to face each other. Each of the pair of reflectors 20b has inner surface 25b and outer surface 28b as two front surfaces when seen from the thickness direction of reflector 20b. Reflectors 20b are configured similarly to reflectors 20 except the point that the lengths in the direction in which pathway 101 extends are shorter than those of reflectors 20. Thus, specific descriptions are omitted.

Next, an example of an operation that is performed by imaging apparatus 10b according to the variation is described.

Figure 10A:
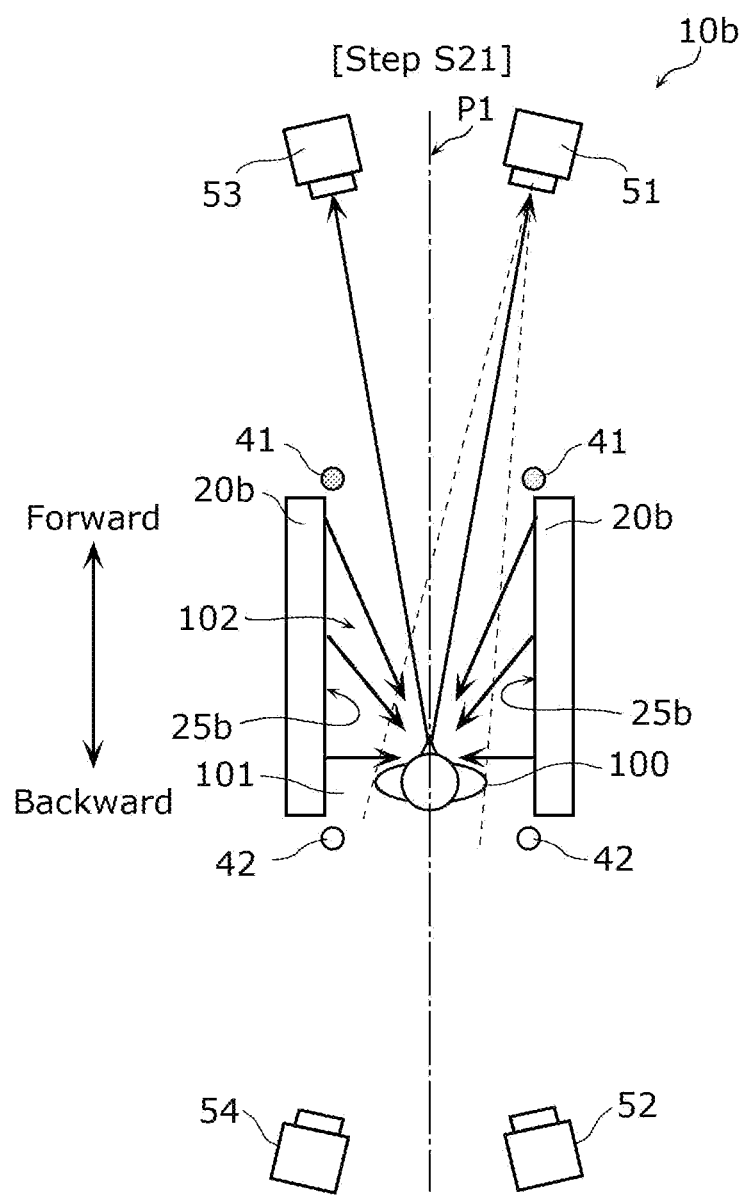
FIG. 10A is a diagram for explaining an example of an operation that is performed by the imaging apparatus according to Variation 2 of the embodiment.
Figure 10B:
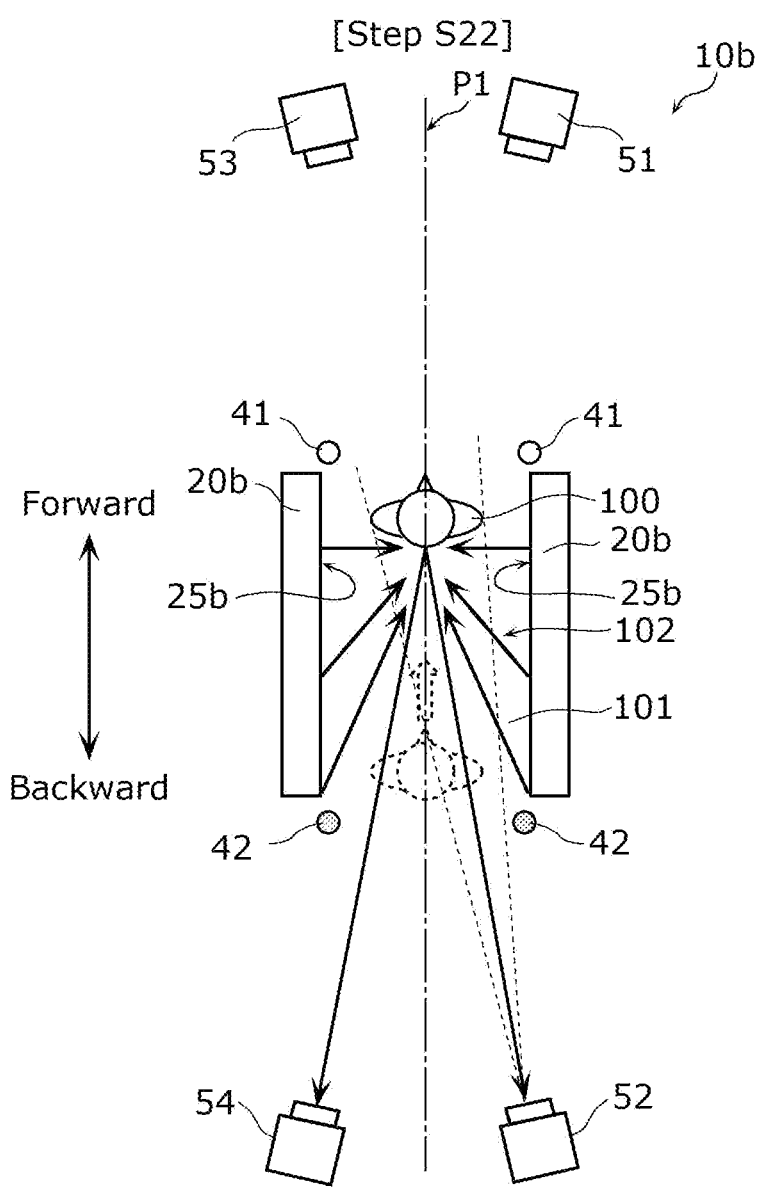
FIG. 10B is a diagram for explaining an example of an operation that is performed by the imaging apparatus according to Variation 2 of the embodiment.

In the following descriptions of the example of the operation, an operation is described which imaging apparatus 10b performs for capturing an image of human 100 who passes through imaging space 102 from the backward direction to the forward direction. FIGS. 10A and 10B are each a diagram for explaining an example of an operation that is performed by imaging apparatus 10b according to the variation.

First, as illustrated in FIG. 10A, in Step S21, human 100 enters imaging space 102, and passes through a backward-direction side end part of imaging space 102. Upon detecting that human 100 is present at the backward-direction side end part of imaging space 102, light source controller 60 causes first light source 41 to emit a sub-terahertz wave. In addition, at this time, light source controller 60 does not cause second light source 42 to emit a sub-terahertz wave.

The sub-terahertz wave emitted from first light source 41 is diffusely reflected by at least one reflector 20b one or more times, and enters human 100 via inner surface 25b. The operation by imaging apparatus 10b hereinafter is the same as in Step S1, and thus specific descriptions are omitted. In other words, first detector 51 generates the image based on the reflected wave by human 100 who is passing through the backward-direction side end part of imaging space 102.

Next, as illustrated in FIG. 10B, in Step S22, human 100 proceeds forward from the position in Step S21, and is located at the forward-direction side end part of imaging space 102. In other words, human 100 passes through the forward-direction side end part of imaging space 102. Upon detecting that human 100 is present at the forward-direction side end part of imaging space 102, light source controller 60 causes second light source 42 to emit a sub-terahertz wave. In addition, at this time, light source controller 60 does not cause first light source 41 to emit a sub-terahertz wave.

The sub-terahertz wave emitted from second light source 42 is diffusely reflected by at least one reflector 20b one or more times, and enters human 100 via inner surface 25b. The operation by imaging apparatus 10b hereinafter is the same as in Step S4, and thus specific descriptions are omitted. In this way, second detector 52 generates the image based on the reflected wave by human 100 who is passing through the forward-direction side end part of imaging space 102.

As described above, in imaging apparatus 10b, first detector 51 generates the image based on the reflected wave by human 100 who is passing through the backward-direction side end part of imaging space 102 in the direction in which pathway 101 extends. As described above, second detector 52 generates the image based on the reflected wave by human 100 who is passing through the forward-direction side end part of imaging space 102 in the direction in which pathway 101 extends. In this way, the images of human 100 are captured at the both ends of imaging space 102. For this reason, even when the image of the front surface of human 100 and the image of the back surface of human 100 are captured, reflectors 20b for diffusely reflecting sub-terahertz waves at both the forward and backward directions relative to human 100 do not need to be so long in the direction in which pathway 101 extends. Thus, even when the image of the front surface of human 100 and the image of the back surface of human 100 are captured, it is possible to reduce the lengths of reflectors 20b in the direction in which pathway 101 extends. As a result, imaging apparatus 10b can be made compact. Furthermore, although human 100 may have a cooped-up feeling because human 100 is sandwiched by reflectors 20b when human 100 passes through imaging space 102, the cooped-up feeling is reduced because the lengths of reflectors 20b are reduced.

For example, although first detector 51 performs imaging before and after human 100 moves from the backward-direction side end part to the center part of imaging space 102 in Step S1 to Step S2, first detector 51 does not perform such imaging in Step S21 and instead performs imaging when human 100 is located at the backward-direction side end part of imaging space 102. For this reason, it is possible to make reflectors 20b shorter than reflectors 20 by the lengths corresponding to the movement of human 100 between Step S1 and Step S2 in the direction in which pathway 101 extends.

It is to be noted that the operation of emitting a sub-terahertz wave by each light source in imaging apparatus 10b is not limited to the example of the operation described above. For example, Imaging apparatus 10b does not always need to include light source controller 60, and first light source 41 and second light source 42 in use may be light sources which emit sub-terahertz waves constantly or at certain intervals. In addition, in Step S21, the range in which the reflected wave by human 100 enters first detector 51 is a range Indicated by broken lines which extend from first detector 51 in FIG. 10A. In the range, second light source 42 and a part of reflector 20b are not located. In other words, first detector 51 is disposed in a positional relationship in which second light sources 42 and reflectors 20b are not located within an angle range at which a reflected wave by human 100 can be received by first detector 51 in the case where human 100 is located at the backward-direction side end part of imaging space 102. Likewise, in Step S22, the range in which the reflected wave by human 100 enters second detector 52 is a range indicated by broken lines which extend from second detector 52 in FIG. 10B. In the range, first light sources 41 and parts of reflectors 20b are not located. In other words, second detector 52 is disposed in a positional relationship in which first light sources 41 and reflectors 20b are not located within an angle range at which a reflected wave by human 100 can be received by second detector 52 in the case where human 100 is located at the forward-direction side end part of imaging space 102. For this reason, in Step S21 and Step S22, even when first light source 41 and second light source 42 emit sub-terahertz waves at the same time, images generated by first detector 51 and second detector 52 based on reflected waves by human 100 are unlikely to be unclear.

Variation 3

Next, an imaging apparatus according to Variation 3 of the embodiment is described.

The imaging apparatus according to Variation 3 of the embodiment is mainly different from the imaging apparatus according to the embodiment in that detectors generate images of a human who is located in the forward direction and in the backward direction relative to reflectors and who are passing through an Imaging space. In addition, the imaging apparatus according to Variation 3 of the embodiment is also different from the imaging apparatus according to the embodiment in that each detector comprises a plurality of detectors. The imaging apparatus according to Variation 3 of the embodiment is also different from the imaging apparatus according to the embodiment in that the lengths of reflectors in the direction in which a pathway extends and the distances between first detectors and second detectors are shorter. The differences from the embodiment are mainly described hereinafter, and descriptions of the common points are omitted or simplified.

Figure 11:
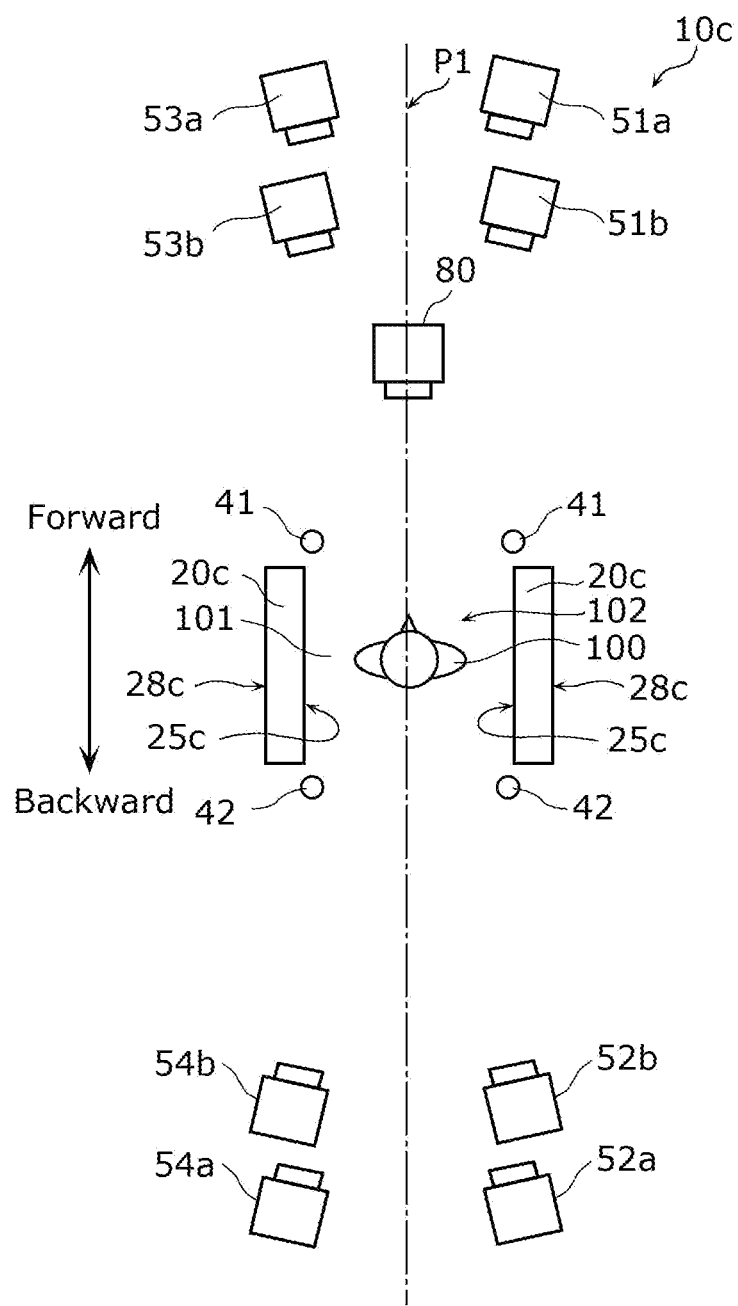
FIG. 11 is a schematic diagram illustrating the imaging apparatus according to Variation 3 of the embodiment when seen from above.

FIG. 11 is a schematic diagram illustrating imaging apparatus 10c according to the variation of the embodiment when seen from above. As Illustrated in FIG. 11, imaging apparatus 10c is configured to include: reflectors 20c instead of reflectors 20 in imaging apparatus 10; and a plurality of first detectors 51a and 51b, a plurality of second detectors 52a and 52a, a plurality of third detectors 53a and 53b, and a plurality of fourth detectors 54a and 54b, instead of first detector 51, second detector 52, third detector 53, and fourth detector 54 in imaging apparatus 10. In imaging apparatus 10c, elements other than reflectors 20c, the plurality of first detectors 51a and 51b, the plurality of second detectors 52a and 52a, the plurality of third detectors 53a and 53b, and the plurality of fourth detectors 54a and 54b are identical to those in imaging apparatus 10.

Reflector 20c covers the space above pathway 101 that human 100 passes through, from at least one of the both sides of pathway 101. In this variation, reflectors 20c sandwiches imaging space 102 above pathway 101 that human 100 passes through from the both sides of pathway 101. In this variation, a pair of reflectors 20c stand from the floor at the both sides of pathway 101 that human 100 passes through to face each other. Each of the pair of reflectors 20c has inner surface 25c and outer surface 28c as two front surfaces when seen from the thickness directions of reflectors 20c. Reflectors 20c are configured similarly to reflectors 20 except the point that the lengths in the direction in which pathway 101 extends are shorter than those of reflectors 20. Thus, specific descriptions are omitted.

The plurality of first detectors 51a and 51b are each located at the forward direction side relative to reflectors 20c in the direction in which pathway 101 extends. The plurality of first detectors 51a and 51b are arranged along the direction in which pathway 101 extends. Specifically, first detectors 51a and 51b are arranged along the direction in which pathway 101 extends, in this order from the side farther from reflectors 20c, that is, from the forward direction side. Each of the plurality of first detectors 51a and 51b includes image sensor 55 and optical system 56, like first detector 51.

The plurality of second detectors 52a and 52b are each located at the backward direction side relative to reflectors 20c in the direction in which pathway 101 extends. Specifically, second detectors 52a and 52b are arranged along the direction in which pathway 101 extends, in this order from the side farther from reflectors 20c, that is, from the backward direction side. Each of the plurality of second detectors 52a and 52b includes image sensor 55a and optical system 56a, like second detector 52.

The plurality of third detectors 53a and 53b are each located at the forward direction side relative to reflectors 20c in the direction in which pathway 101 extends. Specifically, third detectors 53a and 53b are arranged along the direction in which pathway 101 extends, in this order from the side farther from reflectors 20c, that is, from the forward direction side. Each of the plurality of third detectors 53a and 53b includes image sensor 55b and optical system 56b, like third detector 53.

The plurality of fourth detectors 54a and 54b are each located at the backward direction side relative to reflectors 20c in the direction in which pathway 101 extends. Specifically, fourth detectors 54a and 54b are arranged along the direction in which pathway 101 extends, in this order from the side farther from reflectors 20c, that is, from the backward direction side. Each of the plurality of fourth detectors 54a and 54b includes image sensor 55c and optical system 56c, like fourth detector 54.

Next, an example of an operation that is performed by imaging apparatus 10c according to the variation is described.

In the following descriptions of the example of the operation, an operation is described which imaging apparatus 10c performs for capturing an image of human 100 who passes through imaging space 102 from the backward direction to the forward direction. FIGS. 12A, 12B, 12C, and 12D are each a diagram for explaining an example of an operation that is performed by imaging apparatus 10c according to this variation.

Figure 12A:
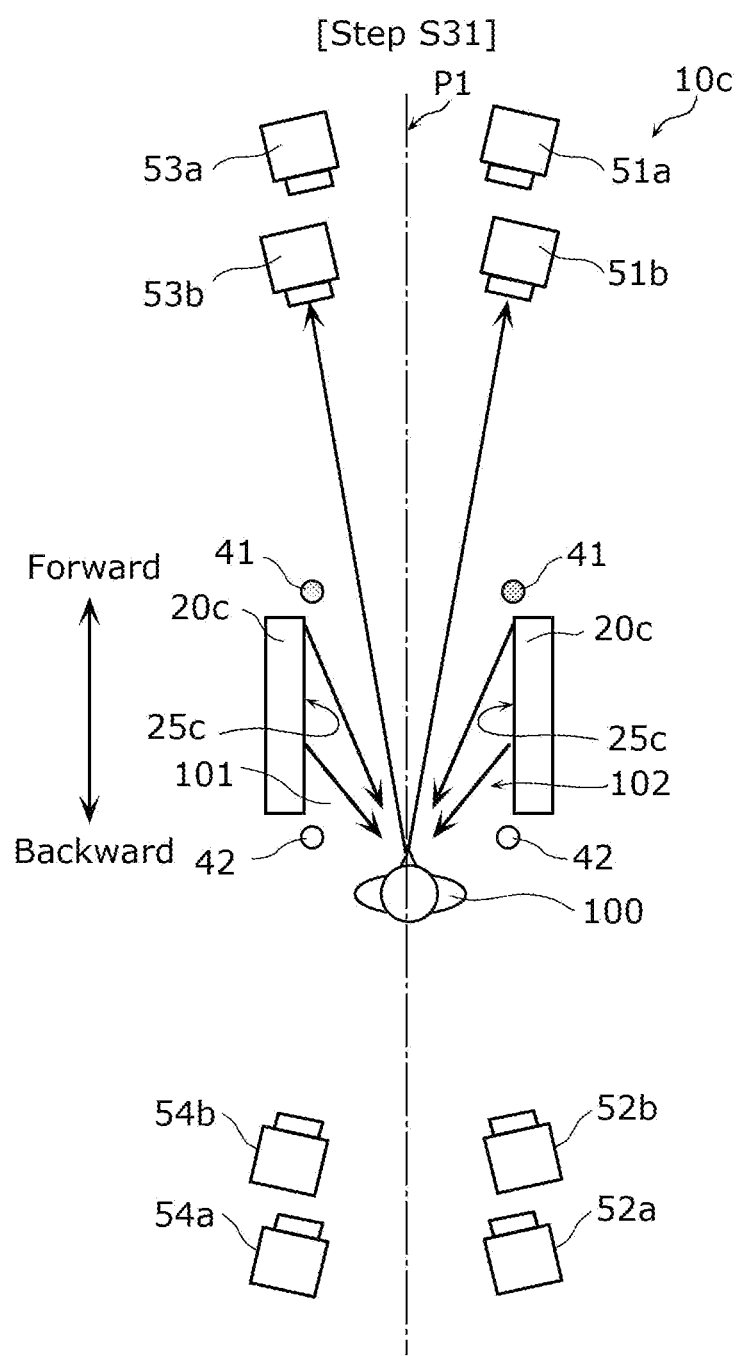
FIG. 12A is a diagram for explaining an example of an operation that is performed by the imaging apparatus according to Variation 3 of the embodiment.

First, as illustrated in FIG. 12A, in Step S31, human 100 proceeds toward imaging space 102, and is located at the backward direction side relative to reflectors 20c. Upon detecting that human 100 is present at the backward direction side relative to reflectors 20c, light source controller 60 causes first light source 41 to emit a sub-terahertz wave. For example, light source controller 60 detects the presence of human 100 by receiving, from sensor 80, a signal indicating that human 100 is present at the backward direction side relative to reflectors 20c. In addition, at this time, light source controller 60 does not cause second light source 42 to emit a sub-terahertz wave.

The sub-terahertz wave emitted from first light source 41 is diffusely reflected by reflector 20c one or more times, and enters human 100 via inner surface 25c. The reflected wave of the sub-terahertz wave that has entered human 100 and has been reflected by human 100 enters first detector 51b. First detector 51b receives the reflected wave by human 100. Imaging controller 70 causes first detector 51b to generate an image based on the reflected wave received by first detector 51b at a timing at which light source controller 60 causes first light source 41 to emit a sub-terahertz wave. In this way, first detector 51b generates the image of the front surface of human 100. First detector 51b outputs the image generated to image processor 90. For example, light source controller 60 detects that generation of the image by first detector 51b has been completed, and causes first light source 41 to turn off.

Figure 12B:
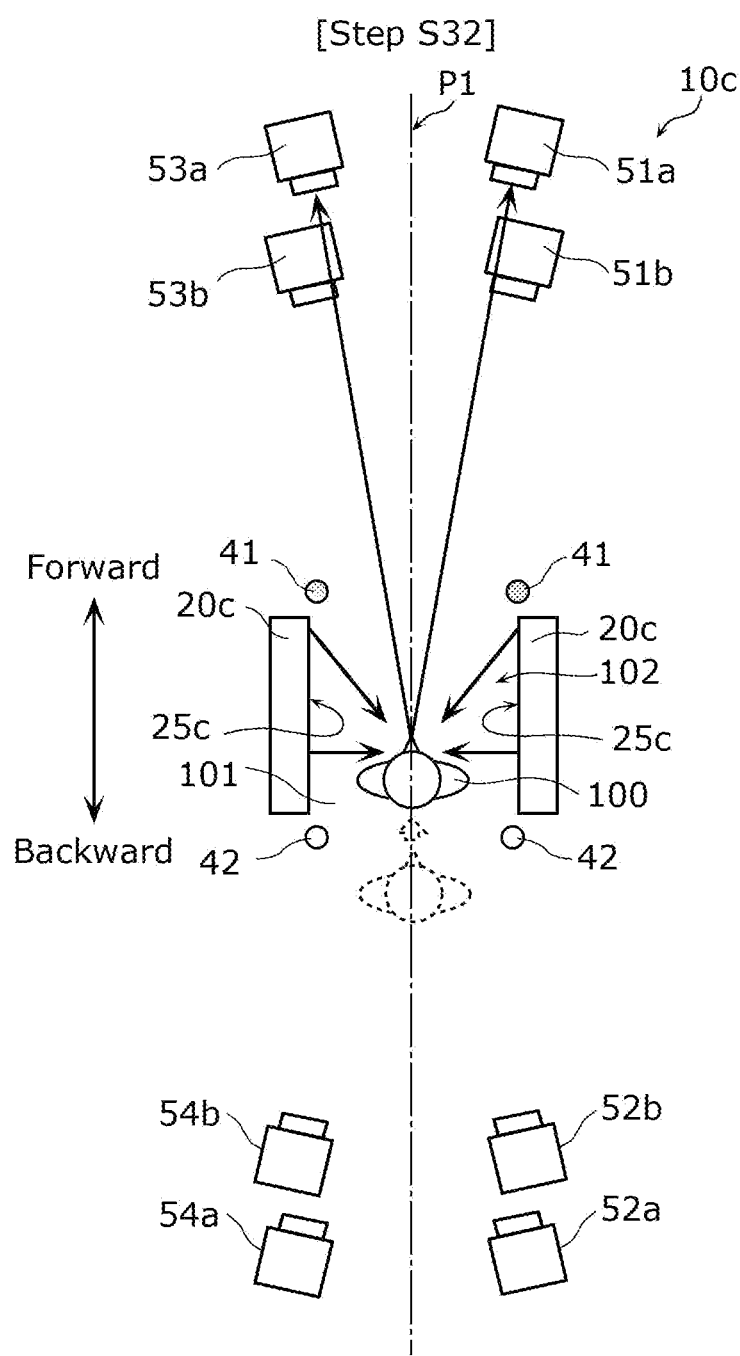
FIG. 12B is a diagram for explaining an example of an operation that is performed by the imaging apparatus according to Variation 3 of the embodiment.

Next, as illustrated in FIG. 12B, in Step S32, human 100 proceeds forward from the position in Step S31, enters imaging space 102, and is located at the backward-direction side end part of imaging space 102. In other words, human 100 passes through the backward-direction side end part of imaging space 102. Upon detecting that human 100 is present at the backward-direction side end part of imaging space 102, light source controller 60 causes first light source 41 to emit a sub-terahertz wave. In addition, at this time, light source controller 60 does not cause second light source 42 to emit a sub-terahertz wave.

The sub-terahertz wave emitted from first light source 41 is diffusely reflected by at least one reflector 20c one or more times, and enters human 100 via inner surface 25c. The reflected wave of the sub-terahertz wave that has entered human 100 and has been reflected by human 100 enters first detector 51a. First detector 51a receives the reflected wave by human 100. Imaging controller 70 causes first detector 51a to generate an image based on the reflected wave received by first detector 51a at a timing at which light source controller 60 causes first light source 41 to emit a sub-terahertz wave. In other words, first detector 51a generates the image based on the reflected wave by human 100 who is passing through the backward-direction side end part of imaging space 102. In this way, first detector 51a generates the image of the front surface of human 100. First detector 51a outputs the image generated to image processor 90. For example, light source controller 60 detects that generation of the image by first detector 51a has been completed, and causes first light source 41 to turn off.

In this way, in Step S31 to Step S32, the plurality of first detectors 51a and 51b generate the plurality of images based respectively on the reflected wave by human 100 located at the backward direction side relative to reflectors 20c in the direction in which pathway 101 extends and the reflected wave by human 100 passing through imaging space 102. In this way, imaging apparatus 10c generates the images of human 100 before human 100 enters imaging space 102, and thus the lengths of reflectors 20c in the direction in which pathway 101 extends can be reduced. As a result, Imaging apparatus 10c can be made compact. Furthermore, although human 100 may have a cooped-up feeling because human 100 is sandwiched by reflectors 20c when human 100 passes through imaging space 102, the cooped-up feeling is reduced because the lengths of reflectors 20c are reduced. For example, in the direction in which pathway 101 extends, reflectors 20c can be shorter than reflectors 20b by the lengths corresponding to the movement of human 100 between Steps S31 and Step S32.

In Steps S31 and Step S32, detector 51 caused to generate images are replaced with first detector 51a and first detector 51b arranged in the direction in which pathway 101 extends, and thus images based on reflected waves that enter first detectors 51a and 51b at similar incidence angles are captured.

In Steps S31 and Step S32, the angle ranges for sub-terahertz waves that enter human 100 become narrower than in the case of, for example, the example of the operation (for example, Step S1) according to the above-described embodiment. However, since the angle ranges for sub-terahertz waves that enter human 100 are different between Steps S31 and Step S32, images based on reflected waves of the sub-terahertz waves that have entered at different angles and reflected by human 100 are captured. Specifically, in Step S31, a sub-terahertz wave having a comparatively small gradient relative to inner surface 25c enters human 100, and in Step S32, a sub-terahertz wave having a comparatively large gradient relative to inner surface 25c enters human 100. In this way, images of different surfaces of human 100 are captured in the plurality of images, which reduces decrease in detection accuracy In the case where imaging apparatus 10c is used to detect a dangerous object, etc., that human 100 conceals and carries.

In addition, for example, arranging first detector 51a and first detector 51b apart from each other by the length corresponding to the movement of human 100 between Step S31 and Step S32 equals the incidence angles of the reflected waves by human 100 that enter first detector 51a and first detector 51b. In this case, since the angle ranges for the sub-terahertz waves that enter human 100 are different between Step S31 and Step S32, reflected waves stemming from the different gradients of the sub-terahertz waves that enter human 100 are reflected toward the detectors. In other words, in Step S31 and Step S32, the sub-terahertz waves having different gradients relative to inner surfaces 25c and entering human 100 are reflected toward the detectors. For this reason, by equalling the incidence angles of the reflected waves by human 100 that enter between first detector 51a and first detector 51b at the time of imaging, images to be captured by first detector 51a and first detector 51b have reduced overlapping ranges of imaging-target surfaces of human 100.

In addition, imaging processor 90 may perform image processing for synthesizing the image generated by first detector 51b in Step S31 and the image generated by first detector 51a in Step S32.

Figure 12C:
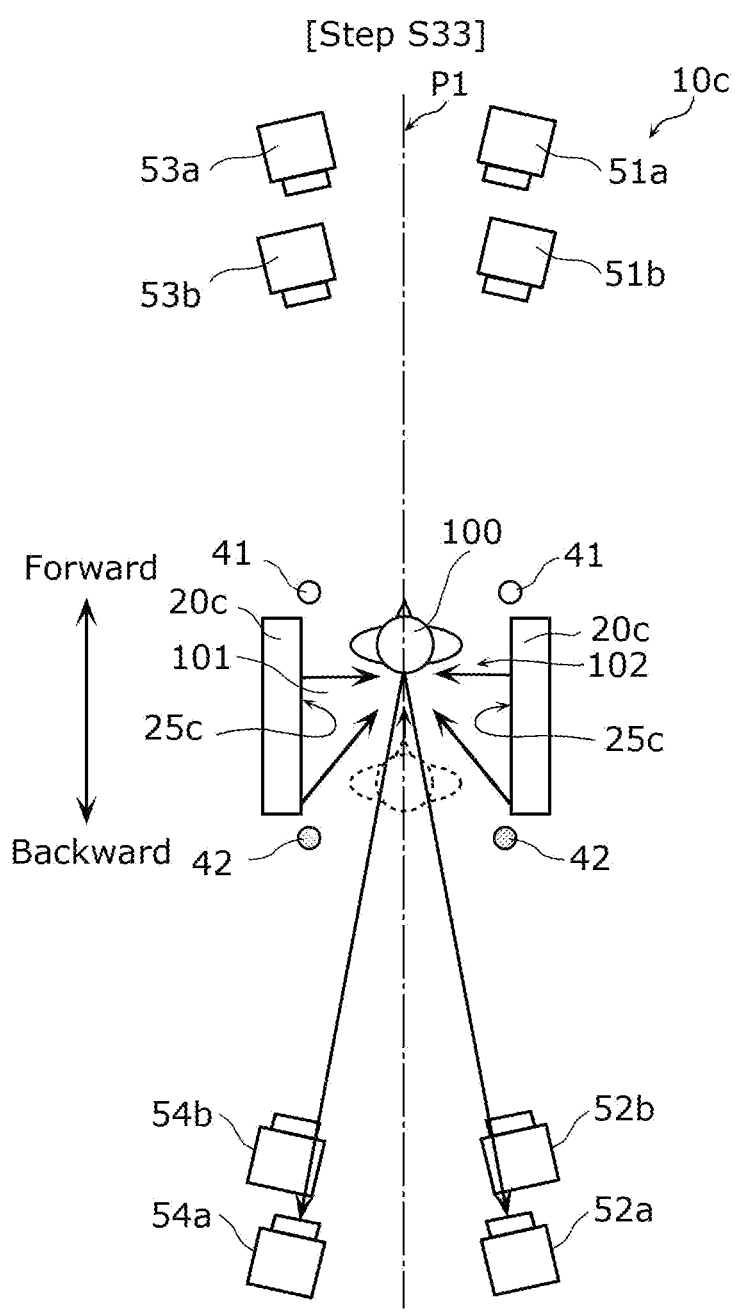
FIG. 12C is a diagram for explaining an example of an operation that is performed by the imaging apparatus according to Variation 3 of the embodiment.

Next, as Illustrated in FIG. 12C in Step S33, human 100 proceeds forward from the position in Step S32, and is located at the forward-direction side end part of imaging space 102. In other words, human 100 passes through the forward-direction side end part of imaging space 102. Upon detecting that human 100 is present at the forward-direction side end part of imaging space 102, light source controller 60 causes second light source 42 to emit a sub-terahertz wave. In addition, at this time, light source controller 60 does not cause second light source 41 to emit a sub-terahertz wave.

The sub-terahertz wave emitted from first light source 42 is diffusely reflected by at least one reflector 20c one or more times, and enters human 100 via inner surface 25c. The reflected wave of the sub-terahertz wave that has entered human 100 and has been reflected by human 100 enters second detector 52a. Second detector 52a receives the reflected wave by human 100. Imaging controller 70 causes second detector 52a to generate an image based on the reflected wave received by second detector 52a at a timing at which light source controller 60 causes second light source 42 to emit a sub-terahertz wave. In other words, second detector 52a generates the image based on the reflected wave by human 100 who is passing through the forward-direction side end part of imaging space 102. In this way, second detector 52a captures an image of the back surface of human 100, Second detector 52a outputs the Image generated to image processor 90. For example, light source controller 60 detects that generation of the image by second detector 52a has been completed, and causes second light source 42 to turn off.

Figure 12D:
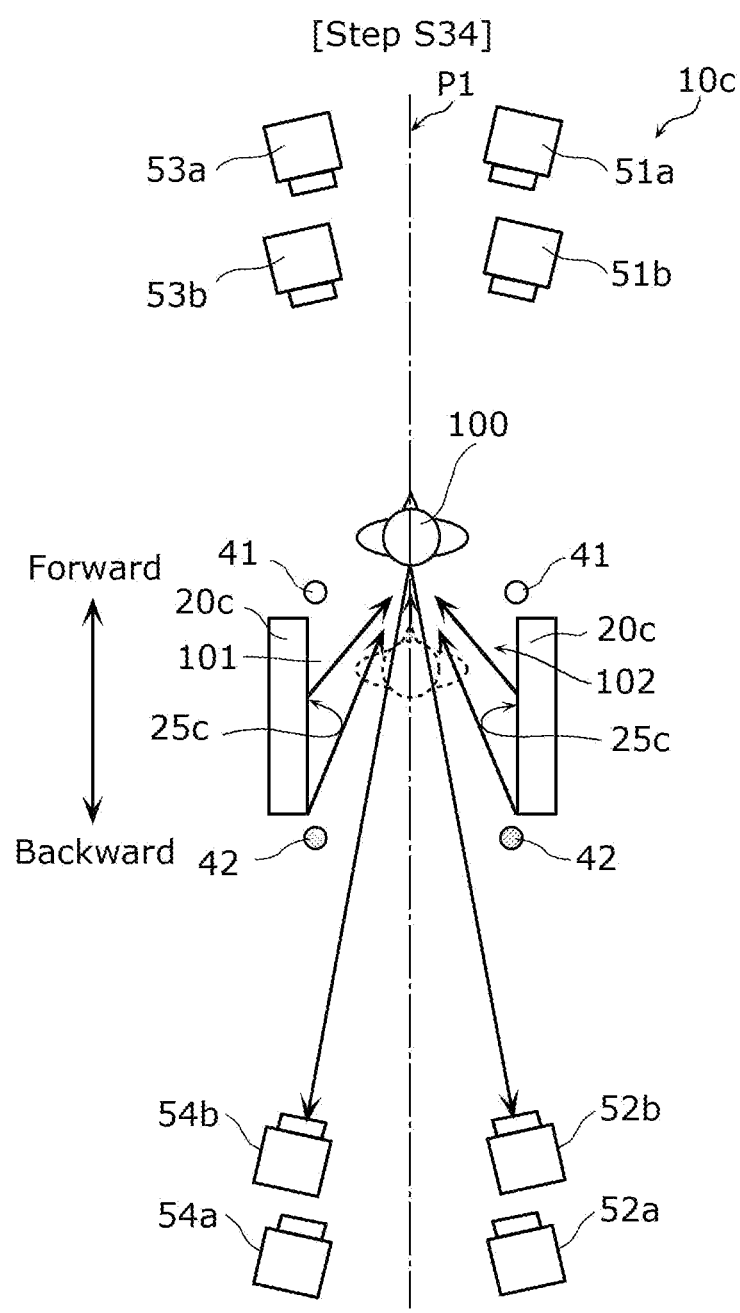
FIG. 12D is a diagram for explaining an example of an operation that is performed by the imaging apparatus according to Variation 3 of the embodiment.

Next, as illustrated in FIG. 12D, in Step S34, human 100 proceeds forward from the position in Step S33, and is located at the forward direction side relative to reflectors 20c. Upon detecting that human 100 is present at the forward direction side relative to reflectors 20c, light source controller 60 causes second light source 42 to emit a sub-terahertz wave. In addition, at this time, light source controller 60 does not cause first light source 41 to emit a sub-terahertz wave.

The sub-terahertz wave emitted from second light source 42 is diffusely reflected by reflector 20c one or more times, enters human 100 via inner surface 25c. The reflected wave of the sub-terahertz wave that has entered human 100 and has been reflected by human 100 enters second detector 52b. Second detector 52b receives the reflected wave by human 100. Imaging controller 70 causes second detector 52b to generate an image based on the reflected wave received by second detector 52b at a timing at which light source controller 60 causes second light source 42 to emit a sub-terahertz wave. In this way, second detector 52b generates the image of the back surface of human 100. Second detector 52b outputs the image generated to image processor 90. For example, light source controller 60 detects that generation of the Image by second detector 52b has been completed, and causes second light source 42 to turn off.

In this way, also in the generation of the images by the plurality of second detectors 52a and 52b in Step S33 and Step S34, effects similar to those provided by the generation of the images by the plurality of first detectors 51a and 51b in Step S31 and Step S32 are obtained.

It is to be noted that, in this variation, imaging apparatus 10c may include one first detector 51 instead of the plurality of first detectors 51a and 51b. In this case, first detector 51 is disposed at, for example, any position between the positions at which first detector 51a and first detector 51b are located. In addition, imaging apparatus 10c may include a driving mechanism for moving first detector 51 between the positions at which first detector 51a and first detector 51b are located. First detector 51 may move to the position of first detector 51b in Step S31, and move to the position of first detector 51a in Step 32. These things applicable to the plurality of first detectors 51a and 51b are also applicable to the plurality of second detectors 52a and 52b, the plurality of third detectors 53a and 53b, and the plurality of fourth detectors 54a and 54b.

OTHER EMBODIMENTS

Although the imaging apparatus according to the present disclosure has been described above based on an embodiment, the present disclosure is not limited to the embodiment. Various modifications to the embodiment which may be conceived by those skilled in the art, as well as embodiments resulting from optional combinations of elements from different embodiments may be included within the scope of one or more aspects of the present disclosure as long as they do not depart from the scope of the present disclosure.

For example, in the embodiment and each variation described above, each of reflectors 20, 20a, 20b, 20c has a plate shape, but the shape thereof is not limited thereto. At least a part of any one of reflector 20, 20a, 20b, or 20c may be curved. For example, any one of reflector 20, 20a, 20b, or 20c may have a plate shape that is curved so that, for example, parts of a pair of reflectors 20 are closer to each other. The parts are located at at least the upper-, forward-, or backward-side in the direction in which pathway 101 extends. In addition, each of reflectors 20, 20a, 20b, and 20c may be provided by being divided into a plurality of reflectors.

Figure 13:
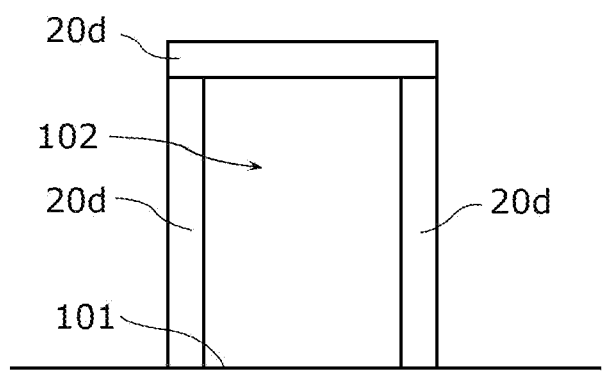
FIG. 13 is a schematic diagram of reflectors according to a variation when seen from a forward direction.

In addition, in the embodiment and each variation described above, imaging apparatuses 10, 10a, 10b, and 10c may include one or more reflectors which are located at at least one of the upper side or the lower side of imaging space 102 and diffusely reflect sub-terahertz waves, in addition to the pair of reflectors 20, 20a, 20b, and 20c. FIG. 13 is a schematic diagram of reflectors according to a variation when seen from a forward direction. In FIG. 13, elements other than reflectors 20d of the imaging apparatus are not illustrated. As illustrated in FIG. 13, three reflectors 20d sandwich imaging space 102 from the both sides of pathway 101, and furthermore cover imaging space 102 from above. In this way, the sub-terahertz wave entered Imaging space 102 is prevented from being output from the upper side of imaging space 102, and thus the sub-terahertz wave mostly remains within imaging space 102. For example, three reflectors 20d may be included in any of imaging apparatuses 10, 10a, 10b, and 10c, instead of the pair of reflectors 20, 20a, 20b, or 20c.

In addition, in the embodiment and each variation described above, reflectors 20, 20a, 20b, and 20c each include reflective member 21, cover member 24, and cover member 27, but the configuration of each reflector is not limited thereto. Reflectors 20 may each include only one of cover member 24 or cover member 27. Alternatively, reflectors 20, 20a, 20b, and 20c may be configured with reflective member 21 without including cover member 24 and cover member 27. In this case, main surface 22 constitutes inner surface 25, and main surface 23 constitutes outer surface 28.

Alternatively, in the embodiment and each variation described above, any of imaging apparatuses 10, 10a, 10b, and 10c does not always need to include light source controller 60, imaging controller 70, and sensor 80. For example, any of imaging apparatuses 10, 10a, 10b, and 10c may include an operation receiver which receives an operation from a user, and, based on the operation from the user, capture images of human 100 and perform, for example, an operation in the example of the operation in any of the embodiment and each variation.

Although the imaging target is human 100 in the embodiment and each variation described above, imaging targets are not limited thereto. Imaging targets may be baggage, etc.

Alternatively, in the embodiment and each variation described above, any of imaging apparatuses 10, 10a, 10b, and 10c does not always need to include imaging controller 70. For example, each detector may have the function of imaging controller 70 in any of imaging apparatuses 10, 10a, 10b, and 10c. Alternatively, the respective detectors may generate images sequentially, and may output the images generated sequentially to image processor 90 without control on the timings for generating the images.

Alternatively, in the embodiment and each variation described above, any of imaging apparatuses 10, 10a, 10b, and 10c does not always need to include sensor 80. For example, light source controller 60 and imaging controller 70 may obtain a signal from an external sensor such as a camera, or the like which is provided around any of imaging apparatuses 10, 10a, 10b, and 10c.

Alternatively, for example, imaging apparatus 10 does not always need to include all the elements described in the embodiment and each variation, and may include only elements for causing desired operations.

In the above embodiment, each of the elements such as light source controller 60, imaging controller 70, image processor 90 may be configured as dedicated hardware or may be implemented by executing a software program suitable for the element. Each of the elements may be implemented by means of a program executer such as a CPU or a processor reading and executing a software program recorded on a recording medium such as a hard disc or a semiconductor memory.

In addition, each of the elements may be a circuit (or an integrated circuit). Each of the circuits may be configured as one circuit as a whole, or as separated circuits. Each of the circuits may be a general circuit or a dedicated circuit.

These general and specific aspects of the present invention may be implemented using a system, an apparatus, a method, an integrated circuit, a computer program, or a non-transitory computer-readable recording medium such as a CD-ROM. Alternatively, these general and specific aspects of the present invention may be implemented as any combination of systems, apparatuses, methods, integrated circuits, computer programs, or non-transitory computer-readable recording media. For example, the present invention may be implemented as a program for causing a computer to execute control that is performed by a controller, etc., included in each of the elements of the imaging apparatus.

In addition, the order of the processes in the operation that is performed by the imaging apparatus as described in the above embodiment is one example. The order of the processes may be changed, and the processes may be executed in parallel.

In addition, various modification, replacement, addition, omission, etc., to the above embodiment may be made within the scope of the claims or the ranges equivalent to the scope.

Each of the elements in each of the above-described embodiments may be configured in the form of an exclusive hardware product, or may be realized by executing a software program suitable for the element. Each of the elements may be realized by means of a program executing unit, such as a CPU and a processor, reading and executing the software program recorded on a recording medium such as a hard disk or a semiconductor memory. Here, the software program for realizing the imaging apparatus according to each of the embodiments is a program described below.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The imaging apparatuses according to one or more exemplary embodiments disclosed herein are widely applicable to Imaging apparatuses which image objects.

The invention claimed is:

1. An imaging apparatus comprising:
a reflector which covers an imaging space on a pathway that an imaging target passes through, from at least one of both sides of the pathway, and diffusely reflects a sub-terahertz wave;
a first light source which emits a sub-terahertz wave onto the reflector;
a second light source which emits a sub-terahertz wave onto the reflector;
a first detector which receives a reflected wave of the sub-terahertz wave emitted from the first light source, diffusely reflected by the reflector, and reflected by the imaging target, and generates an image based on the reflected wave received;
a second detector which receives a reflected wave of the sub-terahertz wave emitted from the second light source, diffusely reflected by the reflector, and reflected by the imaging target, and generates an image based on the reflected wave received; and
a light source controller which controls emission of the sub-terahertz wave from each of the first light source and the second light source,
wherein the first light source and the first detector are located at a first direction side relative to a center of the imaging space in a direction in which the pathway extends,
wherein the second light source and the second detector are located at a second direction side in a direction opposite to the first direction relative to the center of the imaging space in the direction in which the pathway extends,
the light source controller:
causes the first light source to emit the sub-terahertz wave in a first period and does not cause the second light source to emit the sub-terahertz wave in the first period, so that, in the first period, the sub-terahertz wave is emitted from the first direction side toward the center and onto the reflector by the first light source, and no sub-terahertz wave is emitted onto the imaging target from the second direction side by the second light source; and
causes the second light source to emit the sub-terahertz wave in a second period immediately after the first period and does not cause the first light source to emit the sub-terahertz wave in the second period, so that, in the second period, the sub-terahertz wave is emitted from the second direction side toward the center and onto the reflector by the second light source, and no sub-terahertz wave is emitted onto the imaging target from the first direction side by the first light source,
the first detector generates an image based on the reflected wave reflected by the imaging target and received in the first period, and
the second detector generates an image based on the reflected wave reflected by the imaging target and received in the second period.

2. The imaging apparatus according to claim 1, wherein the reflector sandwiches the imaging space from the both sides of the pathway.

3. The imaging apparatus according to claim 1, further comprising:
a sensor which detects the imaging target,
wherein the light source controller starts the first period by causing the first light source to emit the sub-terahertz wave, upon receiving, from the sensor, a signal indicating that the imaging target is present at an end part at the second direction side of the imaging space.

4. The imaging apparatus according to claim 1, further comprising:
a sensor which detects the imaging target,
wherein the light source controller starts the first period by causing the first light source to emit the sub-terahertz wave upon receiving, from the sensor, a signal indicating that the imaging target is present at a center part of the imaging space, and starts the second period by causing the second light source to emit the sub-terahertz wave immediately after the first period.

5. The imaging apparatus according to claim 1, wherein one of the first detector or the second detector performs exposure in the generation of the image based on the reflected wave reflected by the imaging target and received, and immediately after completion of the exposure, a remaining one of the first detector and the second detector starts exposure in the generation of the image based on the reflected wave reflected by the imaging target and received.

6. The imaging apparatus according to claim 1, wherein when the imaging target passes through the imaging space:
the first detector generates the image based on the reflected wave reflected by the imaging target that passes through an end part at the second direction side of the imaging space in the direction in which the pathway extends; and the second detector generates the image based on the reflected wave reflected by the imaging target that passes through an end part at the first direction side of the imaging space in the direction in which the pathway extends.

7. The imaging apparatus according to claim 1, wherein the first detector receives, at two or more timings, a reflected wave reflected by the imaging target while the imaging target is passing through the imaging space, and generates a plurality of images each based on the reflected wave received at a corresponding one of the two or more timings.

8. The imaging apparatus according to claim 1, wherein the first detector generates a plurality of images based on each of the reflected wave reflected by the imaging target located at the second direction side relative to the reflector in the direction in which the pathway extends and the reflected wave reflected by the imaging target that is passing through the imaging space.

9. The imaging apparatus according to claim 8, comprising:

a plurality of first detectors each of which is the first detector, wherein the plurality of first detectors are arranged in the direction in which the pathway extends.

10. The imaging apparatus according to claim 1, further comprising:

a third detector which receives a reflected wave of the sub-terahertz wave emitted from the first light source, diffusely reflected by the reflector, and reflected by the imaging target, and generates an image based on the reflected wave received, wherein the third detector is located at the first direction side relative to the center of the imaging space in the direction in which the pathway extends, and the first detector and the third detector have different incident directions of the reflected waves reflected by the image target.

11. The imaging apparatus according to claim 1, wherein the first detector is located at the first direction side relative to the reflector in the direction in which the pathway extends, and the first light source is located between the reflector and the first detector.

12. The imaging apparatus according to claim 1, wherein the first light source includes at least one of (i) a plurality of point light sources which are arranged along the reflector when seen from the direction in which the pathway extends and each of which emits a sub-terahertz wave or (ii) a line light source which extends along the reflector when seen from the direction in which the pathway extends and which emits a sub-terahertz wave.

13. The imaging apparatus according to claim 1, further comprising:

a sensor which detects the imaging target, wherein the light source controller starts the first period by causing the first light source to emit the terahertz wave, upon receiving, from the sensor, a signal indicating that the imaging target is present at the second direction side relative to the imaging space.

14. The imaging apparatus according to claim 1, comprising:

two reflectors each of which is the reflector, wherein a pair of reflectors which are the two reflectors sandwiches the imaging space from the both sides of the pathway, wherein the first light source includes at least one of (i) a plurality of point light sources which are arranged along an end part in the direction of each of the pair of reflectors when seen from the direction in which the pathway extends and each of which emits a sub-terahertz wave or (ii) a line light source which extends along the end part in the direction of each of the pair of reflectors when seen from the direction in which the pathway extends and which emits a sub-terahertz wave.

* * * * *